US012610344B2

(12) United States Patent
Wang et al.

(10) Patent No.: US 12,610,344 B2
(45) Date of Patent: Apr. 21, 2026

(54) REMOTE USER EQUIPMENT, RADIO ACCESS NODE, RELAY USER EQUIPMENT AND METHODS IN A WIRELESS COMMUNICATIONS NETWORK

(71) Applicant: Telefonaktiebolaget LM Ericsson (PUBL), Stockholm (SE)

(72) Inventors: Min Wang, Luleå (SE); Jan Christoffersson, Luleå (SE); Zhang Zhang, Beijing (CN)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 388 days.

(21) Appl. No.: 18/247,299

(22) PCT Filed: Oct. 4, 2021

(86) PCT No.: PCT/SE2021/050972
§ 371 (c)(1),
(2) Date: Mar. 30, 2023

(87) PCT Pub. No.: WO2022/075907
PCT Pub. Date: Apr. 14, 2022

(65) Prior Publication Data
US 2024/0007996 A1 Jan. 4, 2024

(30) Foreign Application Priority Data
Oct. 7, 2020 (WO) ................ PCT/CN2020/119846

(51) Int. Cl.
*H04W 68/00* (2009.01)

(52) U.S. Cl.
CPC ................................. *H04W 68/005* (2013.01)

(58) Field of Classification Search
None
See application file for complete search history.

(56) References Cited

U.S. PATENT DOCUMENTS

2019/0254104 A1 8/2019 Gurumoorthy et al.
2019/0373578 A1 12/2019 Hong et al.
(Continued)

FOREIGN PATENT DOCUMENTS

GB 2555662 A 5/2018
WO 2020 150871 A1 7/2020

OTHER PUBLICATIONS

3GPP TR 23.752 V0.3.0 (Jan. 2020); 3rd Generation Partnership Project; Technical Specification Group Services and System Aspects; Study on system enhancement for Proximity based Services (ProSe) in the 5G System (5GS) (Release 17).
(Continued)

*Primary Examiner* — Frantz Bataille
(74) *Attorney, Agent, or Firm* — Baker Botts L.L.P.

(57) ABSTRACT

A method for paging performed by a remote wireless communications device, such as a remote UE. The remote wireless communications device is configured to communicate with a radio access node, via a relaying device, such as a relaying UE. The method comprises monitoring for a paging message on a sidelink between the remote wireless communications device and the relaying device in accordance with a repetitive discontinuous reception scheme, such as a DRX scheme, of the remote wireless communications device. The method may further comprise receiving (904) the paging message on the sidelink in accordance with the repetitive discontinuous reception scheme of the remote wireless communications device.

16 Claims, 18 Drawing Sheets

(56) References Cited

U.S. PATENT DOCUMENTS

| | | | |
|---|---|---|---|
| 2019/0373579 A1 | 12/2019 | Nord | |
| 2021/0051758 A1* | 2/2021 | Xu | H04W 76/18 |
| 2021/0059005 A1* | 2/2021 | Hosseini | H04W 76/28 |

OTHER PUBLICATIONS

3GPP TS 23.287 V16.3.0 (Jul. 2020); 3rd Generation Partnership Project; Technical Specification Group Services and System Aspects; Architecture enhancements for 5G System (5GS) to support Vehicle-to-Everything (V2X) services (Release 16).

3GPP TS 23.303 V16.0.0 (Jul. 2020); 3rd Generation Partnership Project; Technical Specification Group Services and System Aspects; Proximity-based services (ProSe); Stage 2 (Release 16).

3GPP TS 23.501 V16.5.0 (Jul. 2020); 3rd Generation Partnership Project; Technical Specification Group Services and System Aspects; System architecture for the 5G System (5GS); Stage 2 (Release 16).

3GPP TS 23.502 V16.5.0 (Jul. 2020); 3rd Generation Partnership Project; Technical Specification Group Services and System Aspects; Procedures for the 5G System (5GS); Stage 2 (Release 16).

3GPP TS 36.300 V16.3.0 (Sep. 2020); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16).

3GPP TS 38.300 V16.3.0 (Sep. 2020); 3rd Generation Partnership Project; Technical Specification Group Radio Access Network; NR; NR and NG-RAN Overall Description; Stage 2 (Release 16).

3GPP TS 38.314 V16.0.0 (Jul. 2020); 3rd Generation Partnership Project; Technical Specification Group Radio Access Network; NR; Layer 2 Measurements; (Release 16).

3GPP TS 38.213 v16.3.0 (Sep. 2020); 3rd Generation Partnership Project; Technical Specification Group Radio Access Network; NR; Physical layer procedures for control (Release 16).

3GPP TSG-RAN WG2 Meeting #111 electronic; Online, Aug. 17-28, 2020; Agenda Item: 8.7.3; Source: MediaTek Inc. (Email Discussion Rapporteur); Title: Summary of [AT111-e][605][Relay] L2 Relay Mechanism (R2-2008254).

3GPP TS 38.340 V16.1.0 (Jul. 2020); 3rd Generation Partnership Project; Technical Specification Group Radio Access Network; NR; Backhaul Adaptation Protocol (BAP) specification (Release 16).

3GPP TSG RAN Meeting #86; Sitges, Spain, Dec. 9-12, 2019; Source: OPPO; Title: New SID: Study on NR sidelink relay; Document for: Approval; Agenda Item: 9.1.2 (RP-193253 (revision of RP-193118)).

3GPP TSG RAN Meeting #90e; Electronic Meeting, Dec. 7-11, 2020; Source: LG Electronics; Title: WID revision: NR sidelink enhancement; Agenda Item: 9.8.3 (RP-202846 (revision of RP-202253)).

3GPP TS 38.300 v16.6.0 (Jun. 2021) 3rd Generation Partnership Project Technical Specification Group Radio Access Network; NR; NR and NG-RAN Overall Description; Stage 2 (Release 16).

PCT International Search Report issued for International application No. PCT/SE2021/050972—Dec. 13, 2021.

PCT Written Opinion of the International Searching Authority issued for International application No. PCT/SE2021/050972—Dec. 13, 2021.

3GPP TS 38.321 v16.0.0 (Mar. 2020) 3rd Generation Partnership Project; Technical Specification Group Radio Access Network; NR; Medium Access Control (MAC) protocol specification (Release 16).

* cited by examiner

Start 903 receive paging message in accordance with paging DRX of remote UE 904 transmit paging message to remote UE in accordance with paging DRX of remote UE End

REMOTE USER EQUIPMENT, RADIO ACCESS NODE, RELAY USER EQUIPMENT AND METHODS IN A WIRELESS COMMUNICATIONS NETWORK

PRIORITY

This nonprovisional application is a U.S. National Stage Filing under 35 U.S.C. § 371 of International Patent Application Serial No. PCT/SE2021/050972 filed Oct. 4, 2021 and entitled "REMOTE USER EQUIPMENT, RADIO ACCESS NODE, RELAY USER EQUIPMENT AND METHODS IN A WIRELESS COMMUNICATIONS NETWORK" which claims priority to International Patent Application Serial No. PCT/CN2020/119846 filed Oct. 7, 2020, both of which are hereby incorporated by reference in their entirety.

BACKGROUND

In a typical wireless communication network, wireless devices, also known as wireless communication devices, mobile stations, stations (STA) and/or User Equipments (UE), communicate via a Local Area Network such as a W-Fi network or a Radio Access Network (RAN) to one or more core networks (CN). The RAN covers a geographical area which is divided into service areas or cell areas, which may also be referred to as a beam or a beam group, with each service area or cell area being served by a radio access node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio access node. The radio access node communicates over an air interface operating on radio frequencies with the wireless device within range of the radio access node.

Specifications for the Evolved Packet System (EPS), also called a Fourth Generation (4G) network, have been completed within the 3rd Generation Partnership Project (3GPP) and this work continues in the coming 3GPP releases, for example to specify a Fifth Generation (5G) network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio access nodes are directly connected to the EPC core network rather than to RNCs used in 3G networks. In general, in E-UTRAN/LTE the functions of a 3G RNC are distributed between the radio access nodes, e.g. eNodeBs in LTE, and the core network. As such, the RAN of an EPS has an essentially "flat" architecture comprising radio access nodes connected directly to one or more core networks, i.e. they are not connected to RNCs. To compensate for that, the E-UTRAN specification defines a direct interface between the radio access nodes, this interface being denoted the X2 interface.

Wireless Communication Systems in 3GPP

FIG. 1 illustrates a simplified wireless communication system. Consider the simplified wireless communication system in FIG. 1, with a UE 12, which communicates with one or multiple access nodes 103-104, which in turn is connected to a network node 106. The access nodes 103-104 are part of the radio access network 10.

For wireless communication systems pursuant to 3GPP Evolved Packet System, (EPS), also referred to as Long Term Evolution, LTE, or 4G, standard specifications, such as specified in 3GPP TS 36.300 and related specifications, the access nodes 103-104 corresponds typically to a Evolved NodeBs (eNBs) and the network node 106 corresponds typically to either a Mobility Management Entity (MME) and/or a Serving Gateway (SGVV). The eNB is part of the radio access network 10, which in this case is the E-UTRAN (Evolved Universal Terrestrial Radio Access Network), while the MME and SGW are both part of the EPC (Evolved Packet Core network). The eNBs are inter-connected via the X2 interface, and connected to EPC via the S1 interface, more specifically via S1-C to the MME and S1-U to the SGW.

For wireless communication systems pursuant to 3GPP 5G System, 5GS (also referred to as New Radio, NR, or 5G) standard specifications, such as specified in 3GPP TS 38.300 and related specifications, on the other hand, the access nodes 103-104 corresponds typically to an 5G NodeB (gNB) and the network node 106 corresponds typically to either a Access and Mobility Management Function (AMF) and/or a User Plane Function (UPF). The gNB is part of the radio access network 10, which in this case is the NG-RAN (Next Generation Radio Access Network), while the AMF and UPF are both part of the 5G Core Network (5GC). The gNBs are inter-connected via the Xn interface, and connected to 5GC via the NG interface, more specifically via NG-C to the AMF and NG-U to the UPF.

To support fast mobility between NR and LTE and avoid change of core network, LTE eNBs may also be connected to the 5G-CN via NG-U/NG-C and support the Xn interface. An eNB connected to 5GC is called a next generation eNB (ng-eNB) and is considered part of the NG-RAN. LTE connected to 5GC will not be discussed further in this document; however, it should be noted that most of the solutions/features described for LTE and NR in this document also apply to LTE connected to 5GC. In this document, when the term LTE is used without further specification it refers to LTE-EPC.

Paging in NR

The following description of the paging procedure is from 3gpp TS 38.300 v16.6.0.

"Paging allows the network to reach UEs in RRC_IDLE and in RRC_INACTIVE state through Paging messages, and to notify UEs in RRC_IDLE, RRC_INACTIVE and RRC_CONNECTED state of system information change (see clause 7.3.3) and ETWS/CMAS indications (see clause 16.4) through Short Messages. Both Paging messages and Short Messages are addressed with P-RNTI on PDCCH, but while the former is sent on PCCH, the latter is sent over PDCCH directly (see clause 6.5 of TS 38.331).

While in RRC_IDLE the UE monitors the paging channels for CN-initiated paging; in RRC_INACTIVE the UE also monitors paging channels for RAN-initiated paging. A UE need not monitor paging channels continuously though; Paging DRX is defined where the UE in RRC_IDLE or RRC_INACTIVE is only required to monitor paging channels during one Paging Occasion (PO) per DRX cycle (see TS 38.304). The Paging DRX cycles are configured by the network:

1) For CN-initiated paging, a default cycle is broadcast in system information;
2) For CN-initiated paging, a UE specific cycle can be configured via Non-Access Stratum (NAS) signalling;
3) For RAN-initiated paging, a UE-specific cycle is configured via RRC signalling;

The UE uses the shortest of the DRX cycles applicable i.e. a UE in RRC_IDLE uses the shortest of the first two cycles above, while a UE in RRC_INACTIVE uses the shortest of the three.

The POs of a UE for CN-initiated and RAN-initiated paging are based on the same UE ID, resulting in overlapping POs for both. The number of different POs in a DRX cycle is configurable via system information and a network may distribute UEs to those POs based on their IDs.

When in RRC_CONNECTED, the UE monitors the paging channels in any PO signalled in system information for SI change indication and PWS notification. In case of bandwidth adaptation (BA), a UE in RRC_CONNECTED only monitors paging channels on the active BWP with common search space configured.

For operation with shared spectrum channel access, a UE can be configured for an additional number of PDCCH monitoring occasions in its PO to monitor for paging. However, when the UE detects a PDCCH transmission within the UE's PO addressed with P-RNTI, the UE is not required to monitor the subsequent PDCCH monitoring occasions within this PO.

Paging optimization for UEs in CM_IDLE: at UE context release, the NG-RAN node may provide the AMF with a list of recommended cells and NG-RAN nodes as assistance info for subsequent paging. The AMF may also provide Paging Attempt Information consisting of a Paging Attempt Count and the Intended Number of Paging Attempts and may include the Next Paging Area Scope. If Paging Attempt Information is included in the Paging message, each paged NG-RAN node receives the same information during a paging attempt. The Paging Attempt Count shall be increased by one at each new paging attempt. The Next Paging Area Scope, when present, indicates whether the AMF plans to modify the paging area currently selected at next paging attempt. If the UE has changed its state to CM CONNECTED the Paging Attempt Count is reset.

Paging optimization for UEs in RRC_INACTIVE: at RAN Paging, the serving NG-RAN node provides RAN Paging area information. The serving NG-RAN node may also provide RAN Paging attempt information. Each paged NG-RAN node receives the same RAN Paging attempt information during a paging attempt with the following content: Paging Attempt Count, the intended number of paging attempts and the Next Paging Area Scope. The Paging Attempt Count shall be increased by one at each new paging attempt. The Next Paging Area Scope, when present, indicates whether the serving NG_RAN node plans to modify the RAN Paging Area currently selected at next paging attempt. If the UE leaves RRC_INACTIVE state the Paging Attempt Count is reset"

More details of the paging procedure can be found in TS 38.304 v 16.5.0, from where the following text is from:

"The UE may use Discontinuous Reception (DRX) in RRC_IDLE and RRC_INACTIVE state in order to reduce power consumption. The UE monitors one paging occasion (PO) per DRX cycle. A PO is a set of PDCCH monitoring occasions and can consist of multiple time slots (e.g. subframe or OFDM symbol) where paging Downlink Control Information (DCI) can be sent (3gpp TS 38.213). One Paging Frame (PF) is one Radio Frame and may contain one or multiple PO(s) or starting point of a PO.

In multi-beam operations, the UE assumes that the same paging message and the same Short Message are repeated in all transmitted beams and thus the selection of the beam(s) for the reception of the paging message and Short Message is up to UE implementation. The paging message is same for both RAN initiated paging and CN initiated paging.

The UE initiates RRC Connection Resume procedure upon receiving RAN initiated paging. If the UE receives a CN initiated paging in RRC_INACTIVE state, the UE moves to RRC_IDLE and informs NAS.

The PF and PO for paging are determined by the following formulae:

SFN for the PF is determined by:

$$(SFN+PF\_\text{offset})\bmod T=(T \text{ div } N)*(UE\_ID \bmod N)$$

Index (i_s), indicating the index of the PO is determined by:

$$i\_s=\text{floor}(UE\_ID/N)\bmod Ns$$

The PDCCH monitoring occasions for paging are determined according to pagingSearchSpace as specified in TS 38.213 and firstPDCCH-MonitoringOccasionOfPO and nrofPDCCH-MonitoringOccasionPerSSB-InPO if configured as specified in TS 38.331. When SearchSpaceId=0 is configured for pagingSearchSpace, the PDCCH monitoring occasions for paging are same as for RMSI as defined in clause 13 in TS 38.213.

When SearchSpaceId=0 is configured for paging-SearchSpace, Ns is either 1 or 2. For Ns=1, there is only one PO which starts from the first PDCCH monitoring occasion for paging in the PF. For Ns=2, PO is either in the first half frame (i_s=0) or the second half frame (i_s=1) of the PF.

When SearchSpaceId other than 0 is configured for pagingSearchSpace, the UE monitors the (i_s+1)th PO. A PO is a set of 'S*X' consecutive PDCCH monitoring occasions where 'S' is the number of actual transmitted SSBs determined according to ssb-PositionsInBurst in SIB1 and X is the nrofPDCCH-MonitoringOccasionPerSSB-InPO if configured or is equal to 1 otherwise. The [x*S+K]th PDCCH monitoring occasion for paging in the PO corresponds to the Kth transmitted SSB, where x=0, 1, . . . , X−1, K=1, 2, . . . , 5. The PDCCH monitoring occasions for paging which do not overlap with UL symbols (determined according to tdd-UL-DL-ConfigurationCommon) are sequentially numbered from zero starting from the first PDCCH monitoring occasion for paging in the PF. When firstPDCCH-MonitoringOccasionOfPO is present, the starting PDCCH monitoring occasion number of (i_s+1)th PO is the (i_s+1)th value of the firstPDCCH-MonitoringOccasionOfPO parameter; otherwise, it is equal to i_s*S*X. If X>1, when the UE detects a PDCCH transmission addressed to P-RNTI within its PO, the UE is not required to monitor the subsequent PDCCH monitoring occasions for this PO.

NOTE 1: A PO associated with a PF may start in the PF or after the PF.

NOTE 2: The PDCCH monitoring occasions for a PO can span multiple radio frames. When SearchSpaceId other than 0 is configured for paging-SearchSpace the PDCCH monitoring occasions for a PO can span multiple periods of the paging search space.

The following parameters are used for the calculation of PF and i_s above:

T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied).

N: number of total paging frames in T

Ns: number of paging occasions for a PF

PF_offset: offset used for PF determination

UE_ID: 5G-S-TMSI mod 1024

Parameters Ns, nAndPagingFrameOffset, nrofPDCCH-MonitoringOccasionPerSSB-InPO, and the length of default DRX Cycle are signaled in SIB1. The values of N and PF_offset are derived from the parameter nAndPaging-FrameOffset as defined in TS 38.331. The parameter first-PDCCH-MonitoringOccasionOfPO is signalled in SIB1 for paging in initial DL BWP. For paging in a DL BWP other than the initial DL BWP, the parameter first-PDCCH-Moni-toringOccasionOfPO is signaled in the corresponding BWP configuration.

If the UE has no 5G-S-TMSI, for instance when the UE has not yet registered onto the network, the UE shall use as default identity UE_ID=0 in the PF and i_s formulas above.

5G-S-TMSI is a 48 bit long bit string as defined in TS 23.501 V16.5.0. 5G-S-TMSI shall in the formulae above be interpreted as a binary number where the left most bit represents the most significant bit."

In the Paging procedure described in 38.300 and 38.304, the paging message is sent to the UE over the UU interface, i.e. the normal DL. It should also be observed that the PO that a specific UE monitors depends on its UE id (and other parameters configured by RRC), meaning that different UEs may or may not monitor the same POs. This will ensure that different UEs are more or less equally distributed over different POs to avoid congestion.

Sidelink (SL) in NR

The SL is a direct radio link between two UEs, a remote UE and a relaying UE. In 3GPP RAN specifications, "side-link" is the terminology to refer to the direct communication over a PC5 interface. The PC5 interface was originally defined to address the needs of mission-critical communi-cation for public safety community (Public Safety-LTE, or PS-LTE) in 3gpp release 13. The motivation of the mission-critical communication was to allow law enforcement agen-cies or emergency rescue to use the LTE communication even when the infrastructure is not available, such as natural disaster scenario. In 3gpp release 14 and onwards, the use of the PC5 interface has been expanded to meet various market needs, such as communication involving wearable devices such as smartwatch. Sidelink transmissions over NR are specified for Rel. 16. Four new enhancements are particu-larly introduced to NR sidelink transmissions as follows:

Not only broadcast but also unicast and groupcast are supported in sidelink transmissions. For unicast and groupcast, the physical sidelink feedback channel (PSFCH) is newly introduced for a receiving UE to reply decoding status to a transmitting UE.

To improve the latency performance, grant-free transmis-sions that are adopted in NR uplink transmissions are also provided in NR sidelink transmissions.

To alleviate resource collisions among different sidelink transmissions launched by different UEs, it enhances channel sensing and resource selection procedures, which also lead to a new design of Physical Sidelink Control Channel (PSCCH).

To achieve a high connection density, congestion control and thus the Quality of Service (QoS) management is supported in NR sidelink transmissions.

To enable the above enhancements, new physical chan-nels and reference signals are introduced in NR (available in LTE before):

PSSCH (Physical Sidelink Shared Channel, SL version of PDSCH): The PSSCH is transmitted by a sidelink transmitting UE, which conveys sidelink transmission data, system information blocks (SIBs) for radio resource control (RRC) configuration, and a part of SCI.

PSFCH (SL version of Physical Uplink Control Channel (PUCCH)): The PSFCH is transmitted by a sidelink receiving UE for unicast and groupcast, which conveys 1 bit information over 1 Resource Block (RB) for the HARQ acknowledgement (ACK) and the negative ACK (NACK). In addition, channel state information (CSI) is carried in the medium access control (MAC) control element (CE) over the PSSCH instead of the PSFCH.

PSCCH (Physical Sidelink Common Control Channel, SL version of PDCCH): When the traffic to be sent to a receiving UE arrives at a transmitting UE, a transmit-ting UE should first send the PSCCH, which conveys a part of SCI (Sidelink Control information, SL version of DCI) to be decoded by any UE for the channel sensing purpose, including the reserved time-frequency resources for transmissions, demodulation reference signal (DMRS) pattern and antenna port, etc.

SPSS/SSSS (Sidelink Primary/Secondary Synchroniza-tion Signal): Similar to downlink transmissions in NR, in sidelink transmissions, primary and secondary syn-chronization signals (called SPSS and SSSS, respec-tively) are supported. Through detecting the SPSS and SSSS, a UE is able to identify the sidelink synchroni-zation identity (SSID) from the UE sending the SPSS/SSSS. Through detecting the SPSS/SSSS, a UE is therefore able to know the characteristics of the UE transmitting the SPSS/SSSS. A series of process of acquiring timing and frequency synchronization together with SSIDs of UEs is called initial cell search. Note that the UE sending the SPSS/SSSS may not be necessarily involved in sidelink transmissions, and a node (UE/eNB/gNB) sending the SPSS/SSSS is called a synchronization source.

PSBCH (Physical Sidelink Broadcast Channel): The PSBCH is transmitted along with the SPSS/SSSS as a synchronization signal/PSBCH block (SSB). The SSB has the same numerology as PSCCH/PSSCH on that carrier, and an SSB should be transmitted within the bandwidth of the configured BWP. The PSBCH con-veys information related to synchronization, such as the direct frame number (DFN), indication of the slot and symbol level time resources for sidelink transmissions, in-coverage indicator, etc. The SSB is transmitted peri-odically at every 160 ms.

DMRS, phase tracking reference signal (PT-RS), channel state information reference signal (CSIRS): These physical reference signals supported by NR downlink/uplink transmissions are also adopted by sidelink trans-missions. Similarly, the PT-RS is only applicable for FR2 transmission.

Another new feature is the two-stage sidelink control information (SCI). This a version of the DCI for SL. Unlike the DCI, only part (first stage) of the SCI is sent on the PSCCH. This part is used for channel sensing purposes, including the reserved time-frequency resources for trans-missions, demodulation reference signal (DMRS) pattern and antenna port, et,c and may be read by all UEs while the remaining (second stage) scheduling and control informa-tion such as a 8-bits source identity (ID) and a 16-bits destination ID, NDI, RV and HARQ process ID is sent on the PSSCH to be decoded by the receiving UE.

Similar as for PRoSE in LTE, NR sidelink transmissions have the following two modes of resource allocations:

Mode 1: Sidelink resources are scheduled by a gNB.

Mode 2: The UE autonomously selects sidelink resources from a (pre-) configured sidelink resource pool(s) based on the channel sensing mechanism.

For the in-coverage UE, a gNB may be configured to adopt Mode 1 or Mode 2. For the out-of-coverage UE, only Mode 2 may be adopted.

As in LTE, scheduling over the sidelink in NR is done in different ways for Mode 1 and Mode 2.

Mode 1 supports the following two kinds of grants:

Dynamic grant: When the traffic to be sent over sidelink arrives at a transmitting UE, this UE should launch the four-message exchange procedure to request sidelink resources from a gNB (SR on UL, grant, BSR on UL, grant for data on SL sent to UE). During the resource request procedure, a gNB may allocate a sidelink radio network temporary identifier (SL-RNTI) to the transmitting UE (During RA?). If this sidelink resource request is granted by a gNB, then a gNB indicates the resource allocation for the PSCCH and the PSSCH in the downlink control information (DCI) conveyed by PDCCH with Cyclic Redundancy Check (CRC) scrambled with the SL-RNTI. When a transmitting UE receives such a DCI, a transmitting UE may obtain the grant only if the scrambled CRC of DCI may be successfully solved by the assigned SL-RNTI. A transmitting UE then indicates the time-frequency resources and the transmission scheme of the allocated PSSCH in the PSCCH, and launches the PSCCH and the PSSCH on the allocated resources for sidelink transmissions. When a grant is obtained from a gNB, a transmitting UE may only transmit a single Transmission Block (TB). As a result, this kind of grant is suitable for traffic with a loose latency requirement.

Configured grant: For the traffic with a strict latency requirement, performing the four-message exchange procedure to request sidelink resources may induce unacceptable latency. In this case, prior to the traffic arrival, a transmitting UE may perform the four-message exchange procedure and request a set of resources. If a grant is obtained from a gNB, then the requested resources are reserved in a periodic manner. Upon traffic arriving at a transmitting UE, this UE can launch the PSCCH and the PSSCH on the upcoming resource occasion. In fact, this kind of grant is also known as grant-free transmissions.

In both dynamic grant and configured grant, a sidelink receiving UE cannot receive the DCI (since it is addressed to the transmitting UE), and therefore a receiving UE should perform blind decoding to identify the presence of PSCCH and find the resources for the PSSCH through the SCI.

The SCI has a first and second part. The first part (sent on PSCCH) contains reserved time-frequency resources for transmissions, demodulation reference signal (DMRS) pattern and antenna port, etc. . . . and the second part (sent on PSSCH) a 8-bits source identity (ID) and a 16-bits destination ID. The second part of the SCI also includes a 1-bit new data indicator (NDI), 2-bit redundancy version (RV), and 4-bit HARQ process ID. The first part of SCI and the second part of SCI may be also referred to as the first stage SCI and the second stage SCI.

When a transmitting UE launches the PSCCH, CRC is also inserted in the SCI without any scrambling.

In the Mode 2 resource allocation, when traffic arrives at a transmitting UE, this transmitting UE should autonomously select resources for the PSCCH and the PSSCH. To further minimize the latency of the feedback HARQ ACK/ NACK transmissions and subsequently retransmissions, a transmitting UE may also reserve resources for PSCCH/ PSSCH for retransmissions. To further enhance the probability of successful TB decoding at one shot and thus suppress the probability to perform retransmissions, a transmitting UE may repeat the TB transmission along with the initial TB transmission. This mechanism is also known as blind retransmission. As a result, when traffic arrives at a transmitting UE, then this transmitting UE should select resources for the following transmissions:

1) The PSSCH associated with the PSCCH for initial transmission and blind retransmissions.

2) The PSSCH associated with the PSCCH for retransmissions.

Since each transmitting UE in sidelink transmissions should autonomously select resources for above transmissions, how to prevent different transmitting UEs from selecting the same resources turns out to be a critical issue in Mode 2. A particular resource selection procedure is therefore imposed to Mode 2 based on channel sensing. The channel sensing algorithm involves measuring Reference Signal Received Power (RSRP) on different subchannels and requires knowledge of the different UEs power levels of DMRS on the PSSCH or the DMRS on the PSCCH depending on the configuration. This information is known only after receiving SCI launched by (all) other UEs.

Layer 3 (L3) UE-to-Network Relay

In the TR 23.752 v0.3.0 clause 6.6, the layer-3 based UE-to-Network relay is described.

The ProSe 5G UE-to-Network Relay entity provides the functionality to support connectivity to the network for Remote UEs. FIG. 2 illustrates an Architecture model using a ProSe 5G UE-to-Network Relay in TR 23.752 v0.3.0. It can be used for both public safety services and commercial services, e.g. interactive service.

A UE is considered to be a Remote UE for a certain ProSe UE-to-Network relay if it has successfully established a PC5 link to this ProSe 5G UE-to-Network Relay. A Remote UE can be located within NG-RAN coverage or outside of NG-RAN coverage. The interface between the ProSe UE-to-Network relay and the NG-RAN is called Uu. The NG-RAN is connected to the 5GC, which in turn may be connected to an Application Service (AS).

The ProSe 5G UE-to-Network Relay shall relay unicast traffic (UL and DL) between the Remote UE and the network. The ProSe UE-to-Network Relay shall provide generic function that may relay any IP traffic.

One-to-one Direct Communication is used between Remote UEs and ProSe 5G UE-to-Network Relays for unicast traffic as specified in solutions for Key Issue #2 in the TR 23.752 v0.3.0.

The protocol stack for Layer-3 UE-to-Network Relays is shown in FIG. 3 illustrating a Protocol stack for ProSe 5G UE-to-Network Relay in TR 23.752 v0.3.0.

Hop-by-hop security is supported in the PC5 link and Uu link. If there are requirements beyond hop-by-hop security for protection of Remote UE's traffic, security over IP layer needs to be applied.

Further security details (integrity and privacy protection for remote UE-Network (NW) communication) will be specified in 3gpp SA WorkGroup 3 (WG3).

A ProSe 5G UE-to-Network Relay capable UE may register to the network (if not already registered) and establish a PDU session enabling the necessary relay traffic, or it may need to connect to additional PDU session(s) or modify the existing PDU session in order to provide relay traffic towards Remote UE(s). PDU session(s) supporting UE-to-Network Relay shall only be used for Remote ProSe UE(s) relay traffic.

FIG. 4 illustrates ProSe 5G UE-to-Network Relay in TR 23.752 v0.3.0.

0. During the Registration procedure, Authorization and provisioning is performed for the ProSe UE-to-NW relay (0a) and the Remote UE (0b). Authorization and provisioning procedure may be any solution for key issue #1 and #3 in the TR 23.752 v0.3.0.

1. The ProSe 5G UE-to-Network Relay may establish a PDU session for relaying with default PDU session parameters received in step 0 or pre-configured in the UE-to-NW relay, e.g. Single-Network Slice Selection Assistance Information (S-NSSAI), Data Network Name (DNN), Session and Service Continuity (SSC) mode. In case of IPv6, the ProSe UE-to-Network Relay obtains the IPv6 prefix via prefix delegation function from the network as defined in TS 23.501 V16.5.0.

2. Based on the Authorization and provisioning in step 0, the Remote UE performs discovery of a ProSe 5G UE-to-Network Relay using any solution for key issue #1 and #3 in the TR 23.752 v0.3.0. As part of the discovery procedure the Remote UE learns about the connectivity service the ProSe UE-to-Network Relay provides.

3. The Remote UE selects a ProSe 5G UE-to-Network Relay and establishes a connection for One-to-one ProSe Direct Communication as described in TS 23.287 V16.3.0.

If there is no PDU session satisfying the requirements of the PC5 connection with the remote UE, e.g. S-NSSAI, DNN, QoS, the ProSe 5G UE-to-Network Relay initiates a new PDU session establishment or modification procedure for relaying.

4. IPv6 prefix or IPv4 address is allocated for the remote UE as it is defined in TS 23.303 V16.0.0 clauses 5.4.4.2 and 5.4.4.3. From this point the uplink and downlink relaying can start.

5. The ProSe 5G UE-to-Network Relay sends a Remote UE Report Remote User ID, IP info message to the Session Management Function (SMF) for the PDU session associated with the relay. The Remote UE Report message may comprise a Remote User ID and IP info. The Remote User ID is an identity of the Remote UE user, provided via User Info, that was successfully connected in step 3. The SMF stores the Remote User IDs and the related IP info in the ProSe 5G UE-to-Network Relay's for the PDU connection associated with the relay.

For IP info the following principles apply:

for IPv4, the UE-to-network Relay shall report TCP/UDP port ranges assigned to individual Remote UE(s) (along with the Remote User ID);

for IPv6, the UE-to-network Relay shall report IPv6 prefix(es) assigned to individual Remote UE(s) (along with the Remote User ID).

The Remote UE Report message shall be sent when the Remote UE disconnects from the ProSe 5G UE-to-Network Relay, e.g. upon explicit layer-2 link release or based on the absence of keep alive messages over PC5, to inform the SMF that the Remote UE(s) have left.

In the case of Registration Update procedure involving a change of SMF, the Remote User IDs and related IP info corresponding to the connected Remote UEs are transferred to a new SMF as part of Session Management (SM) context transfer for the ProSe 5G UE-to-Network Relay.

NOTE 1: In order for the SMF to have the Remote UE(s) information, the HPLMN and the VPLMN where the ProSe 5G UE-to-Network Relay is authorised to operate, needs to support the transfer of the Remote UE related parameters in case the SMF is in the HPLMN.

NOTE 2: When Remote UE(s) disconnect from the ProSe UE-to-Network Relay, it is up to implementation how relaying PDU sessions are cleared/disconnected by the ProSe 5G UE-to-Network Relay.

After being connected to the ProSe 5G UE-to-Network Relay, the Remote UE keeps performing a measurement of the signal strength of the discovery message sent by the ProSe 5G UE-to-Network Relay for relay reselection.

The solution may also work when the ProSe 5G UE-to-Network Relay UE connects in EPS using LTE. In this case for the Remote UE report the procedures defined in TS 23.303 V16.0.0 may be used.

Layer 2 (L2) UE-to-Network Relay

In the TR 23.752 v0.3.0 clause 6.7, the layer-2 based UE-to-Network relay is described.

General Information

In this clause, the protocol architecture supporting an L2 UE-to-Network Relay UE is provided.

The L2 UE-to-Network Relay UE provides forwarding functionality that can relay any type of traffic over the PC5 link.

The L2 UE-to-Network Relay UE provides the functionality to support connectivity to the 5GS for Remote UEs. A UE is considered to be a Remote UE if it has successfully established a PC5 link to the L2 UE-to-Network Relay UE. A Remote UE can be located within NG-RAN coverage or outside of NG-RAN coverage.

FIG. 5 illustrates the protocol stack for the user plane transport between a remote UE and the UPF, related to a PDU Session, including a Layer 2 UE-to-Network Relay UE. In other words FIG. 5 illustrates a User Plane Stack for L2 UE-to-Network Relay UE in TR 23.752 v0.3.0.

The PDU layer corresponds to the PDU carried between the Remote UE and the Data Network (DN) over the PDU session. It is important to note that the two endpoints of the PDCP link are the Remote UE and the gNB. The relay function is performed below PDCP. This means that data security is ensured between the Remote UE and the gNB without exposing raw data at the UE-to-Network Relay UE.

The adaptation relay layer within the UE-to-Network Relay UE can differentiate between signalling radio bearers (SRBs) and data radio bearers (DRBs) for a particular Remote UE. The adaption relay layer is also responsible for mapping PC5 traffic to one or more DRBs of the Uu. The definition of the adaptation relay layer is under the responsibility of 3gpp RAN WG2.

FIG. 6 illustrates the protocol stack of the NAS connection for the Remote UE to the NAS-Mobility Management (MM) and NAS-Session Management (SM) components. In other words, FIG. 6 illustrates Control Plane for L2 UE-to-Network Relay UE in TR 23.752 V0.3.0.

The NAS messages are transparently transferred between the Remote UE and 5G-AN over the Layer 2 UE-to-Network Relay UE using:

PDCP end-to-end connection where the role of the UE-to-Network Relay UE is to relay the PDUs over the signalling radio bear without any modifications.

N2 connection between the 5G-AN and AMF over N2.

N3 connection between AMF and SMF over N11.

The role of the UE-to-Network Relay UE is to relay the PDUs from the signaling radio bearer without any modifications.

Procedures

FIG. 7 illustrates Connection Establishment for Indirect Communication via UE-to-Network Relay UE in TR 23.752 V0.3.0.

> 0. If in coverage, the Remote UE and UE-to-Network Relay UE may independently perform the initial registration to the network according to registration procedures in TS 23.502 V16.5.0. The allocated 5G Global Unique Temporary Identifier (GUTI) of the Remote UE is maintained when later NAS signalling between Remote UE and Network is exchanged via the UE-to-Network Relay UE.

NOTE: The current procedures shown here assume a single hop relay.

> 1. If in coverage, the Remote UE and UE-to-Network Relay UE independently get the service authorization for indirect communication from the network.
> 2-3. The Remote UE and UE-to-Network Relay UE perform UE-to-Network Relay UE discovery and selection.
> 4. Remote UE initiates a one-to-one communication connection with the selected UE-to-Network Relay UE over PC5, by sending an indirect communication request message to the UE-to-Network Relay.
> 5. If the UE-to-Network Relay UE is in CM_IDLE state, triggered by the communication request received from the Remote UE, the UE-to-Network Relay UE sends a Service Request message over PC5 to its serving AMF.

The Relay's AMF may perform authentication of the UE-to-Network Relay UE based on NAS message validation and if needed the AMF will check the subscription data.

If the UE-to-Network Relay UE is already in CM_CONNECTED state and is authorised to perform Relay service then step 5 is omitted.

> 6. The UE-to-Network Relay UE sends the indirect communication response message to the Remote UE.
> 7. Remote UE sends a NAS message to the serving AMF, i.e. to the remote UE's serving AMF. The NAS message is encapsulated in an RRC message that is sent over PC5 to the UE-to-Network Relay UE, and the UE-to-Network Relay UE forwards the message to the NG-RAN. The NG-RAN derives Remote UE's serving AMF and forwards the NAS message to this AMF.

NOTE: It is assumed that the Remote UE's PLMN is accessible by the UE-to-Network Relay's PLMN and that UE-to-Network Relay UE AMF supports all S-NSSAIs the Remote UE may want to connect to.

If Remote UE has not performed the initial registration to the network in step 0, the NAS message is initial registration message. Otherwise, the NAS message is service request message.

If the Remote UE performs initial registration via the UE-to-Network relay, the Remote UE's serving AMF may perform authentication of the Remote UE based on NAS message validation and if needed the Remote UE's AMF checks the subscription data.

For service request case, User Plane connection for PDU Sessions may also be activated. The other steps follow clause 4.2.3.2 in TS 23.502 V16.5.0.

> 8. Remote UE may trigger a PDU Session Establishment procedure as defined in clause 4.3.2.2 of TS 23.502 V16.5.0.
> 9. The data is transmitted between Remote UE and Remote UE's UPF via UE-to-Network Relay UE and NG-RAN. The UE-to-Network Relay UE forwards all the data messages between the Remote UE and NG-RAN using RAN specified L2 relay method.

SUMMARY

Although both paging of UEs and relaying to remote UEs via sidelink have been specified, a problem is how paging of a remote UE may be accomplished with low power consumption.

Another problem is how the synchronization of the paging of a remote UE may be accomplished.

An object of embodiments herein may be to obviate some of the problems related to paging of remote UEs, or at least reduce the impact of them.

According to an aspect, the object is achieved by a method for paging performed by a remote wireless communications device, such as a remote UE. The remote wireless communications device is configured to communicate with a radio access node, via a relaying device, such as a relaying UE. The method comprises:

Monitoring for a paging message on a sidelink, SL, between the remote wireless communications device and the relaying device in accordance with a repetitive discontinuous reception scheme, such as a DRX scheme, of the remote wireless communications device.

According to a further aspect, the object is achieved by a remote wireless communications device, such as a remote UE, configured to communicate with a radio access node, via a relaying device, such as a relaying UE, the remote wireless communications device further being configured to:

> monitor for a paging message on a sidelink, SL, between the remote wireless communications device and the relaying device in accordance with a repetitive discontinuous reception scheme, such as a DRX scheme, of the remote wireless communications device.

According to a further aspect, the object is achieved by a method for paging a remote wireless communications device performed by a radio access node, wherein the radio access node is configured to communicate with the remote wireless communications device via a relaying device, the method comprises:

> transmitting, via the relaying device, a paging message to the remote wireless communications device in accordance with a repetitive discontinuous reception scheme, such as a DRX scheme, of the remote wireless communications device.

According to a further aspect, the object is achieved by a radio access node, such as a gNB, configured to communicate with a remote wireless communications device via a relaying device, such as a relaying UE, the radio access node further being configured to:

> transmit, via the relaying device, a paging message to the remote wireless communications device in accordance with a repetitive discontinuous reception scheme, such as a DRX scheme, of the remote wireless communications device.

According to a further aspect, the object is achieved by a method for paging a remote wireless communications device performed by a relaying device, wherein the relaying device is configured to relay a paging message from a radio access node to the remote wireless communications device, the method comprises:

> receiving a paging message from the radio access node to the remote wireless communications device in accordance with a repetitive discontinuous reception scheme, such as a DRX scheme, of the remote wireless communications device, and
> transmitting the paging message to the remote wireless communications device in accordance with the repetitive discontinuous reception scheme, such as a DRX scheme, of the remote wireless communications device.

According to a further aspect, the object is achieved by a relaying device configured to relay a paging message from a radio access node to a remote wireless communications device, the relaying device further being configured to:

receive a paging message from the radio access node to the remote wireless communications device in accordance with a repetitive discontinuous reception scheme, such as a DRX scheme, of the remote wireless communications device, and transmit the paging message to the remote wireless communications device in accordance with the repetitive discontinuous reception scheme, such as a DRX scheme, of the remote wireless communications device.

According to a further aspect, the object is achieved by a computer program comprising instructions, which when executed by a processor, causes the processor to perform actions according to any of the aspects above.

According to a further aspect, the object is achieved by a carrier comprising the computer program of the aspect above, wherein the carrier is one of an electronic signal, an optical signal, an electromagnetic signal, a magnetic signal, an electric signal, a radio signal, a microwave signal, or a computer-readable storage medium.

BRIEF DESCRIPTION OF THE DRAWINGS

In the figures, features that appear in some embodiments are indicated by dashed lines.

The various aspects of embodiments disclosed herein, including particular features and advantages thereof, will be readily understood from the following detailed description and the accompanying drawings, in which.

DETAILED DESCRIPTION

Figure 1:
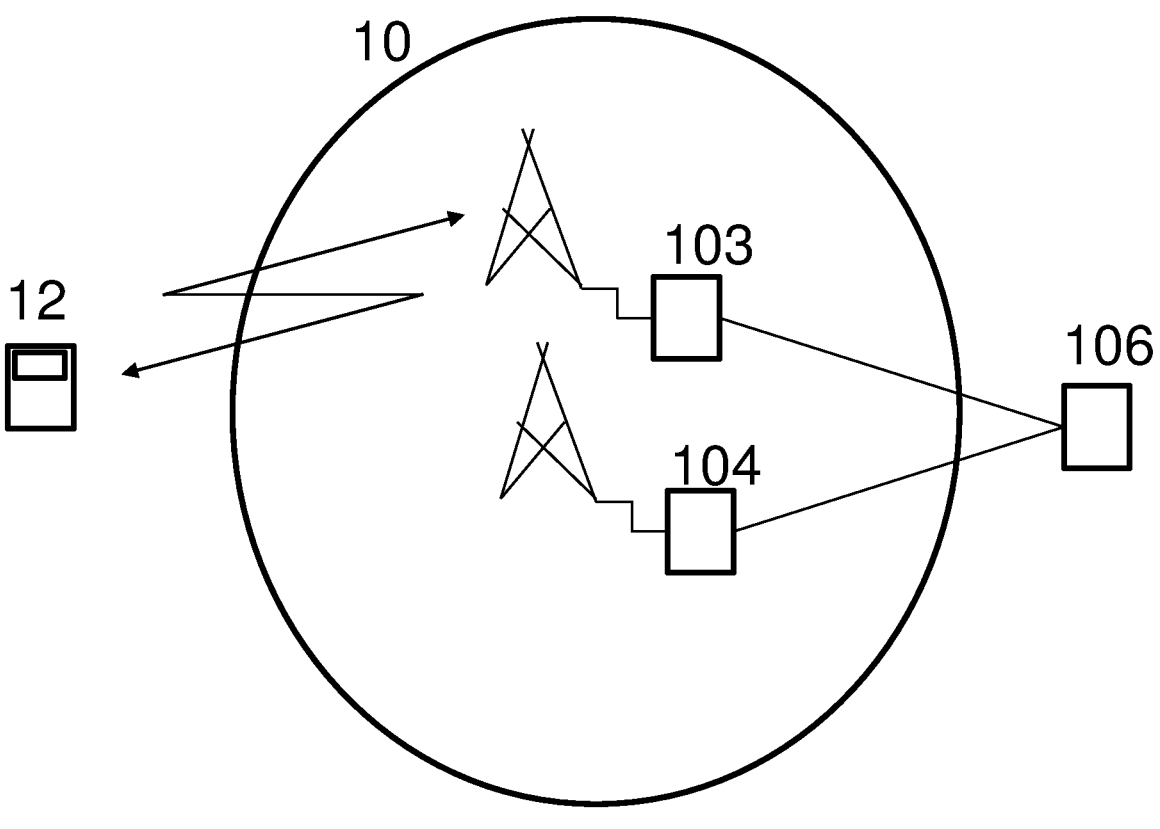
FIG. 1 illustrates a simplified wireless communication system.
Figure 2:
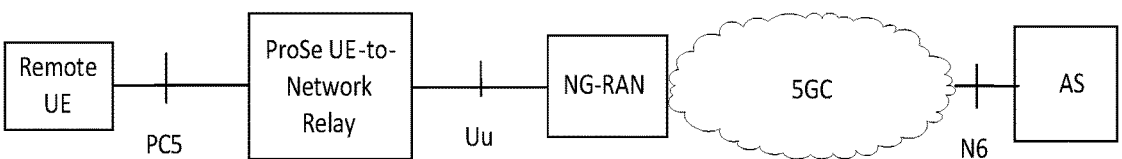
FIG. 2 illustrates a radio network architecture model using a ProSe 5G UE-to-Network Relay.
Figure 3:
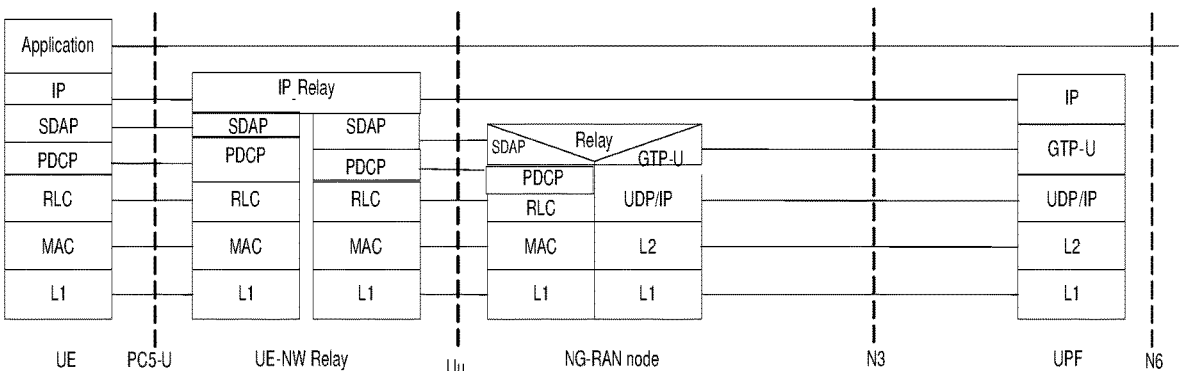
FIG. 3 illustrates a Protocol stack for ProSe 5G UE-to-Network Relay according to TR 23.752.
Figure 4:
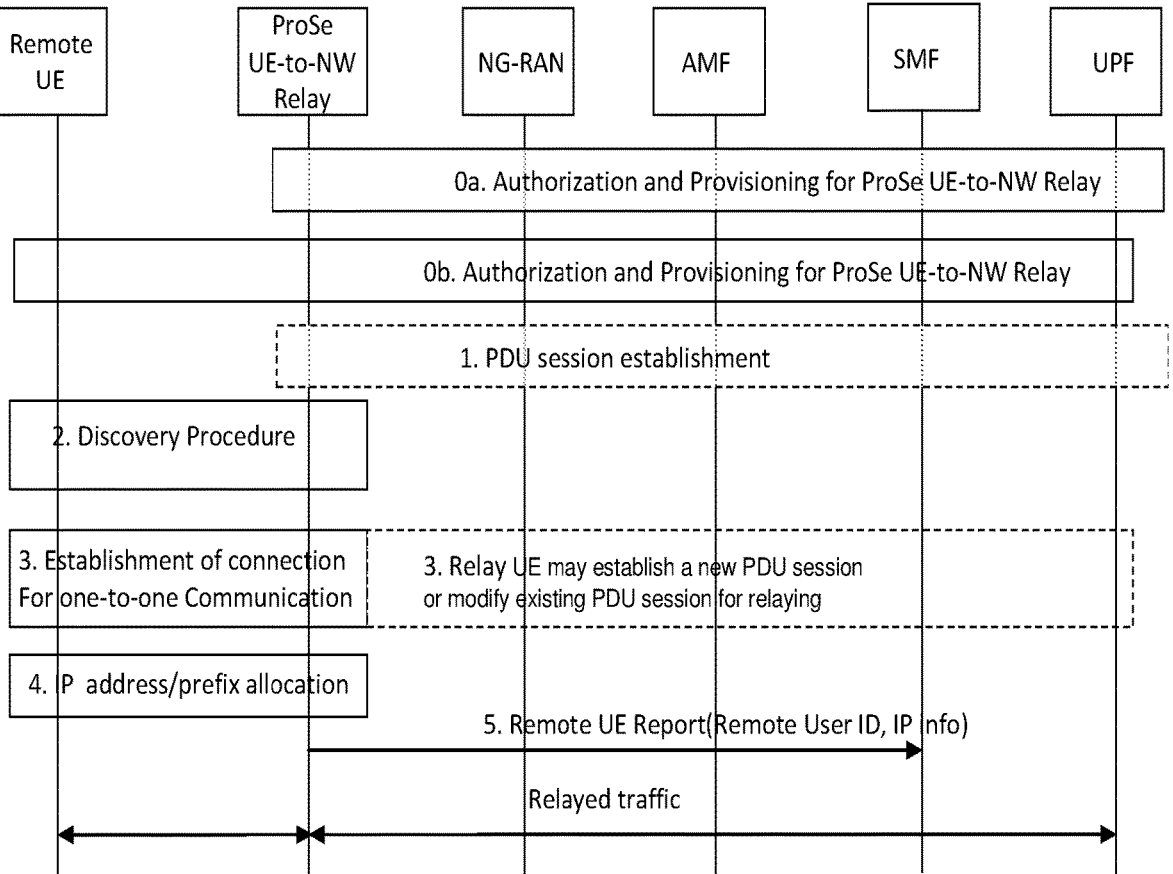
FIG. 4 is a signalling diagram illustrating ProSe 5G UE-to-Network Relay according to TR 23.752.
Figure 5:
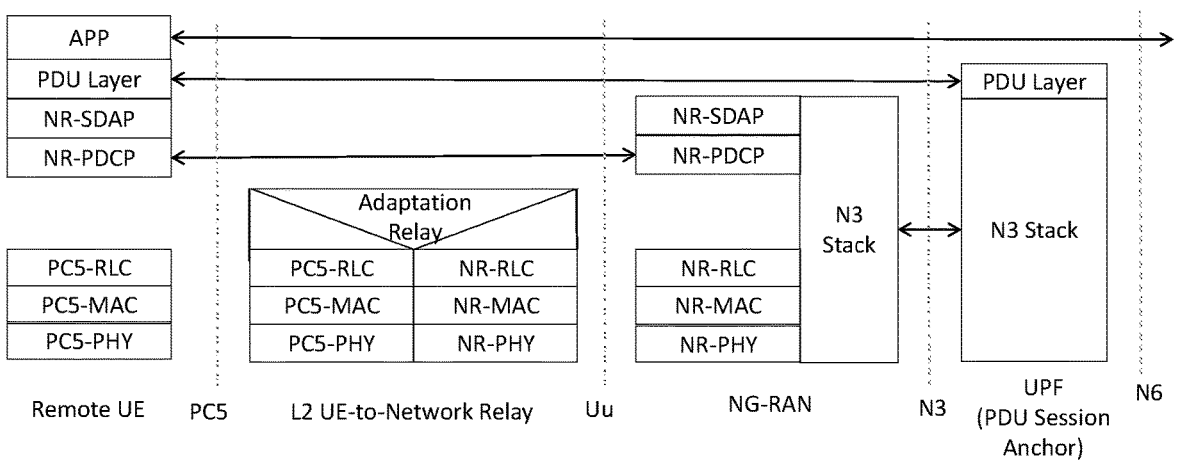
FIG. 5 illustrates a protocol stack for the user plane transport between a remote UE and the UPF, related to a PDU Session, including a Layer 2 UE-to-Network Relay UE.
Figure 6:
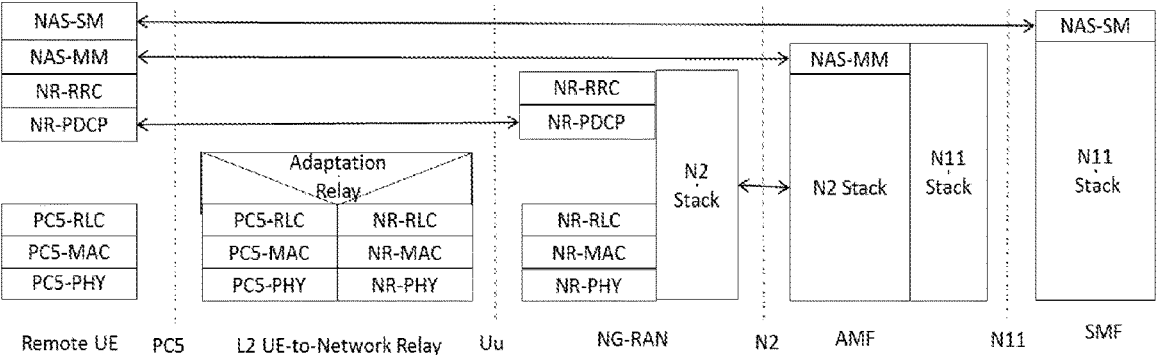
FIG. 6 illustrates the protocol stack of the NAS connection for the Remote UE to the NAS-Mobility Management (MM) and NAS-Session Management (SM) components, FIG. 7 a signalling diagram illustrating Connection Establishment for Indirect Communication via UE-to-Network Relay UE according to TR 23.752.
Figure 7:
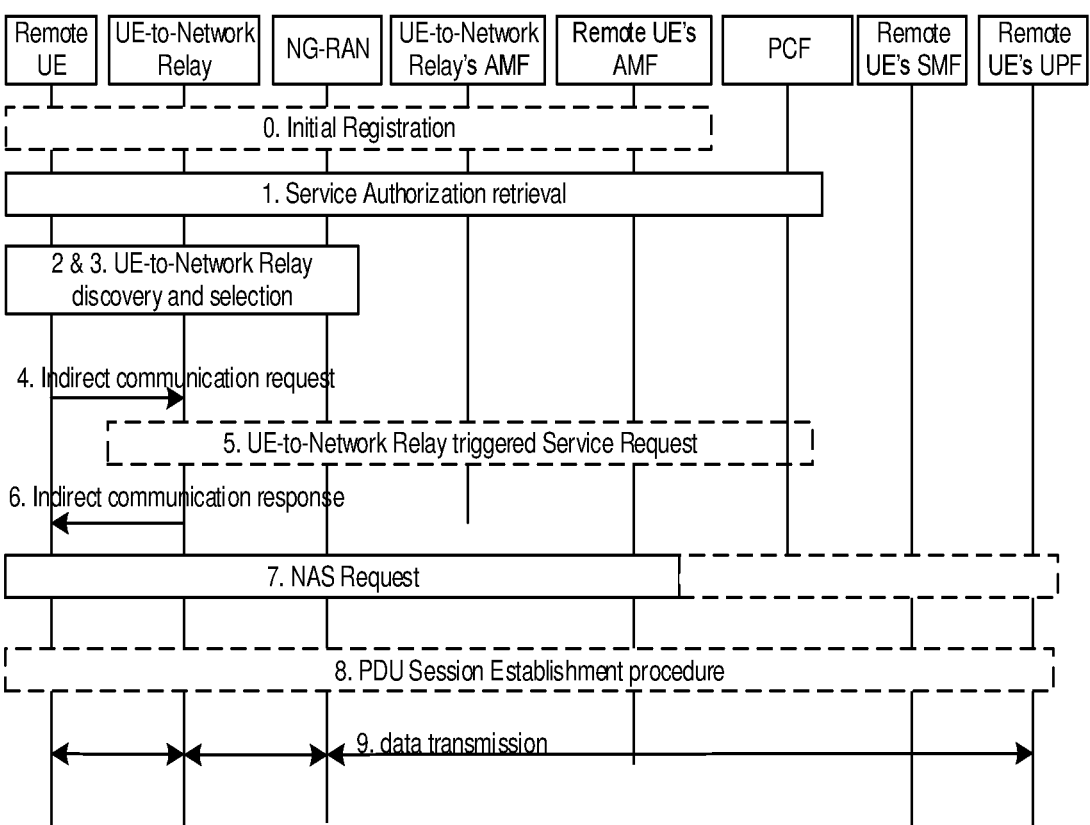

As a part of developing embodiments herein the inventors identified a problem which first will be discussed.

In the last RAN2 meeting (i.e., RAN2 #111-e), it has been agreed that the model A and model B discovery standardized in LTE Rel-12/Rel-13 may be re-used for the Rel-17 sidelink UE-to-NW and UE-to-UE relay.

For both discovery models, RAN2 has decided to not introduce a specific discovery physical channel, in other words, discovery messages will be transmitted using a same channel as for data transmission, SL communication channel, i.e., Physical Sidelink Shared Channel (PSSCH).

UE energy saving is one important performance indicator. There is no energy saving feature defined for SideLink until 3GPP Rel-16. In the 3GPP Rel-17 Work Item (WI) on NR sidelink enhancement RP-202846, "WID revision: NR sidelink enhancement", the below objectives on UE Sidelink energy saving has been agreed and will be studied in a time frame of 3GPP Rel-17.

For Sidelink DRX for broadcast, groupcast, and unicast, WG RAN2 shall:

Define on- and off-durations in sidelink and specify the corresponding UE procedure Specify mechanism aiming to align sidelink DRX wake-up time among the UEs communicating with each other Specify mechanism aiming to align sidelink DRX wake-up time with Uu DRX wake-up time in an in-coverage UE From the above study objectives, DRX mechanisms for Sidelink will be designed and specified in 3GPP Rel-17.

In an L2 UE to network SL relay scenario, a remote UE may be in different RRC states (i.e., RRC IDLE, RRC CONNECTED, or RRC inactive) and a paging mechanism needs to be supported for the remote UE.

In 3gpp meeting RAN2 #111-e, a paging mechanism, referred to as Option 2 and as described below, has been agreed to be a baseline for the remote UE.

Option 2: The Relay UE monitors its linked Remote UE's PO in addition to its own PO. The evolved Remote UE does not need to attempt paging reception over downlink while linked to the Relay UE. The Relay UE may need to monitor multiple paging occasions. The Relay UE has to know the paging occasion of the Remote UE and has to decode a paging message and determine which Remote UE the paging is for. Also, the Relay UE may need to relay the Remote UE's paging over short range link.

Based on the above texts, a relay UE may relay a paging message to a remote UE. However, a remote UE cannot be always active for monitoring possible relayed paging message on the SL, that would cause a high battery consumption. In order to save battery, an option would be to introduce a mechanism to allow the remote UE to monitor the SL link occasionally, e.g., a DRX mechanism. Also, the active occasion should be known to both the remote UE and the relay UE.

Therefore, it may be important to study how to develop such DRX mechanism on the SL link to reduce potential power consumption for paging monitoring.

A problem is therefore how the paging of a remote UE can be accomplished with low power consumption. Another problem is how to achieve a good balance between power consumption reduction and QoS satisfaction.

Another problem is how the synchronization of the paging of a remote UE can be accomplished.

An object of embodiments herein is therefore to improve the handling of paging for remote UEs.

Figure 8:
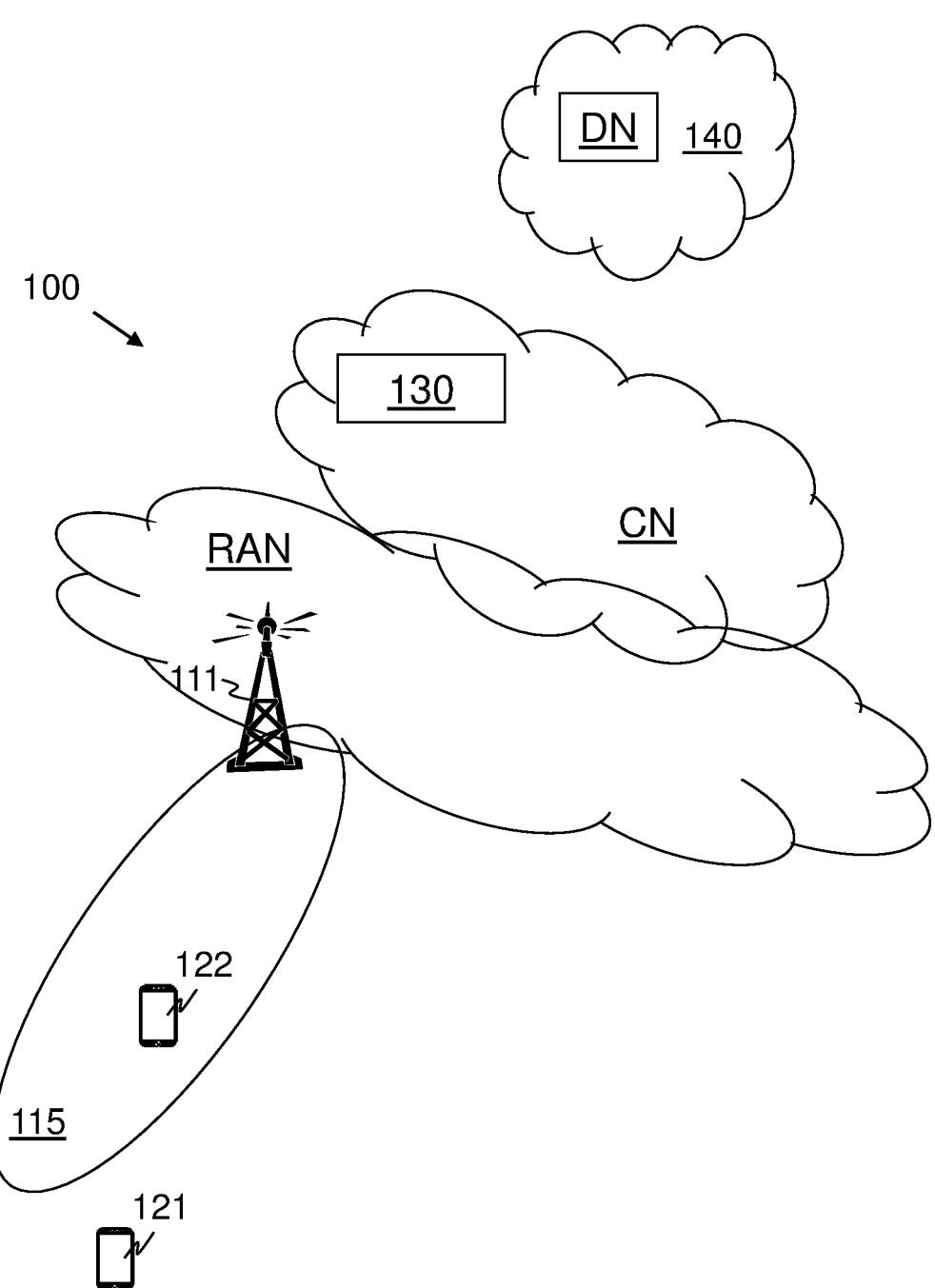
FIG. 8 is a schematic overview depicting a wireless communications network wherein embodiments herein may be implemented.

Embodiments herein relate to wireless communication networks in general. FIG. 8 is a schematic overview depicting a wireless communications network 100 wherein embodiments herein may be implemented. The wireless communications network 100 comprises one or more RANs and one or more CNs. The wireless communications network 100 may use a number of different technologies, such as W-Fi, Long Term Evolution (LTE), LTE-Advanced, 5G, New Radio (NR), Wideband Code Division Multiple Access (WCDMA), Global System for Mobile communications/ enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

Access nodes, such as a radio access node 111, operate in the wireless communications network 100. The radio access node 111 provides radio coverage over a geographical area, a service area referred to as a cell 115, which may also be referred to as a beam or a beam group of a first radio access technology (RAT), such as 5G, LTE, Wi-Fi or similar. The radio access node 111 may be a NR-RAN node, transmission and reception point e.g. a base station, a radio access node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area depending e.g. on the radio access technology and terminology used. The radio access node 111 may comprise a Central Unit (CU) and a Distributed Unit (DU). The respective radio access node 111 may be referred to as a serving radio access node and communicates with a UE with Downlink (DL) transmissions to the UE and Uplink (UL) transmissions from the UE.

A number of wireless communications devices operate in the wireless communication network 100, such as a remote wireless communications device 121, also referred to as a remote UE 121 herein. Further, there may be a relaying device, such as a relay UE 122 that also operates in the wireless communication network 100. The relay UE 122 may for example relay data and/or control signals from the radio access node 111 to the remote UE 121. Relaying may for example provide the functionality to support connectivity to the network for remote UEs. It may for example be used for both public safety services and commercial services, e.g. interactive services. A remote UE may be defined to be a UE that communicates with a DN via UE-to-Network relay. For 3gpp 5G a remote UE may be defined to be a 5G ProSe-enabled UE that communicates with a DN via a 5G ProSe UE-to-Network Relay.

Relaying may be beneficial if the remote UE 121 is unable to connect directly with the radio access node 111, for example if the remote UE 121 is outside the cell 115, as illustrated in FIG. 8.

In another scenario the quality of the connection may be increased by using the relay UE 122 to relay data and/or control signals to the remote UE 121. In such scenarios the remote UE 121 may be within the cell 115, but for example close to the cell border.

The remote UE 121 and the relay UE 122 may each be a mobile station, a non-access point (non-AP) STA, a STA, a user equipment and/or a wireless terminal, that communicate via one or more Access Networks (AN), e.g. RAN, e.g. via the radio access node 111 to one or more CNs, e.g. comprising a CN node 130. It should be understood by the skilled in the art that "UE" is a non-limiting term which means any terminal, wireless communication terminal, user equipment, Machine Type Communication (MTC) device, Device to Device (D2D) terminal, or node, e.g., smart phone, laptop, mobile phone, sensor, relay, mobile tablets or even a small base station communicating within a cell.

Methods herein may in a first aspect be performed by the remote UE 121 and in a second aspect by the radio access node 111, and in a third aspect by the relay UE 122. As an alternative, a Distributed Node (DN) and functionality, e.g. comprised in a cloud 140 as shown in FIG. 8, may be used for performing or partly performing the methods.

Appropriate methods to handle paging of remote wireless communications devices, such as remote UEs, are provided below. In some embodiments, the remote wireless communications device 121 monitors for the paging message on the SL in accordance with a repetitive discontinuous reception scheme of the remote wireless communications device 121. By doing so the remote wireless communications device 121 may reduce power consumption on the SL for paging monitoring, and achieve a good balance between power consumption reduction and QoS satisfaction.

In some embodiments the remote wireless communications device 121 monitors for the paging message on the SL based on a time offset between a first PO on a radio link between the radio access node 111 and the relaying device 122, such as an Uu link, and a second PO on the SL. Such time offset takes into account the time it takes for the relaying device 122 to relay the paging message. By doing so different relay times may be accounted for, which means that the relaying is more flexible.

Figure 9A:
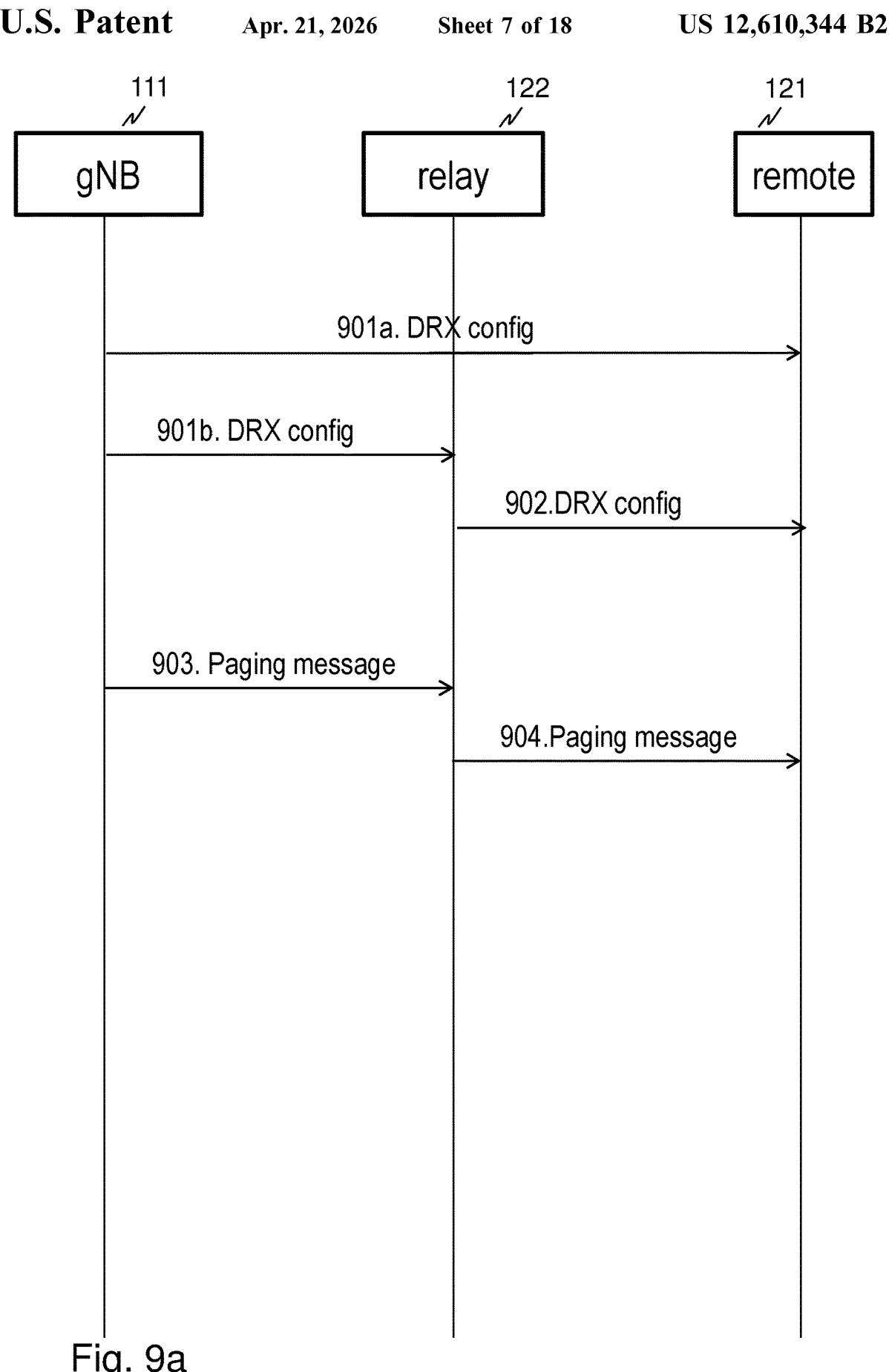
FIG. 9a is a signalling diagram describing methods according to embodiments herein.

Exemplifying methods according to embodiments herein will now be described with reference to a signalling diagram of FIG. 9a describing interaction between the remote wireless communications device 121, the relaying device 122 and the radio access node 111, and to flowcharts of FIGS. 9b-d and with further reference to FIG. 8.

Figure 9B:
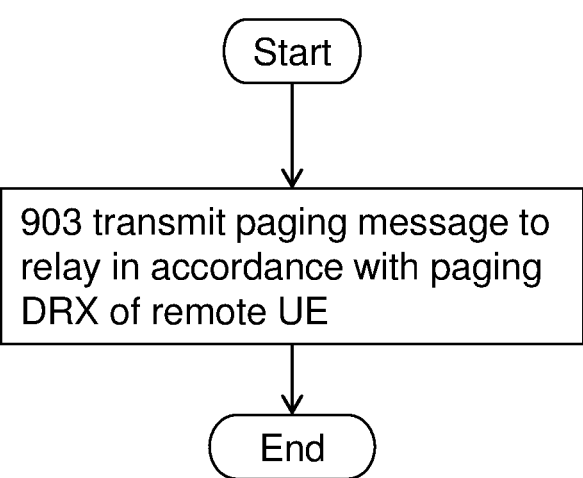
FIG. 9b is a flow chart describing methods performed by a radio access node according to embodiments herein.

FIG. 9b illustrates example methods performed by the radio access node 111.

Figure 9C:
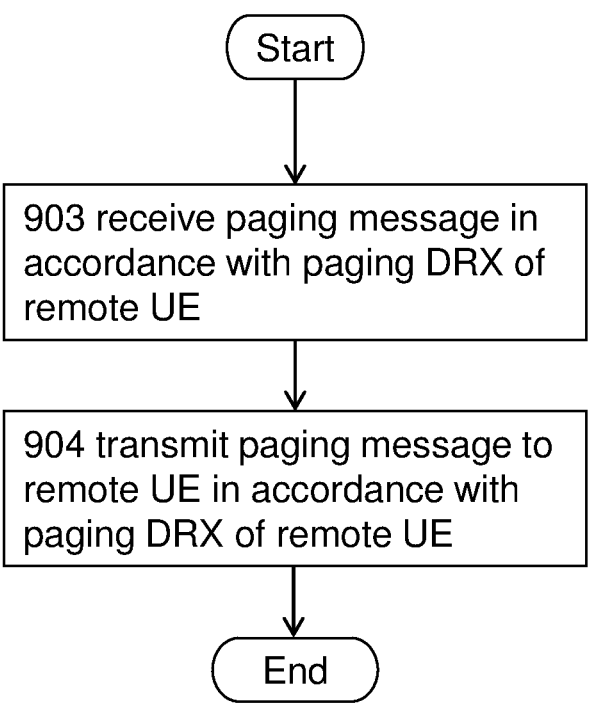
FIG. 9c is a flow chart describing methods performed by a relaying device according to embodiments herein.

FIG. 9c illustrates example methods performed by the relaying device 122.

Figure 9D:
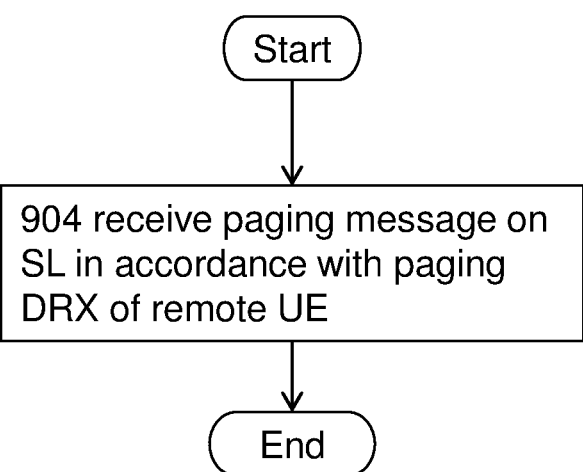
FIG. 9d is a flow chart describing methods performed by a remote wireless communications device according to embodiments herein, FIG. 10 schematically illustrates an example configuration of POs on Uu and SL according to embodiments herein.

FIG. 9d illustrates example methods performed by the remote wireless communications device 121.

The methods may be for paging the remote wireless communications device 121 in the wireless communications network 100.

The methods will first be described in brief, thereafter in more detail. The methods comprises one or more of the following actions, which actions may be taken in any suitable order.

The radio access node 111 is configured to communicate with the remote wireless communications device 121 via the relaying device 122.

In an optional Action 901*a*, the remote wireless communications device 121 is configured by the radio access node 111 to apply a repetitive discontinuous reception scheme, such as a DRX scheme, of the remote wireless communications device 121 for monitoring of a paging message on the SL between the remote wireless communications device 121 and the relaying device 122. For example, the remote wireless communications device 121 may monitor a SL channel, e.g. a PSSCH, between the remote wireless communications device 121 and the relaying device 122.

For example, the remote wireless communications device 121 may receive a configuration to apply the repetitive discontinuous reception scheme for monitoring of the paging message on the SL from the radio access node 111, either directly and/or via the relaying device 122.

In optional Action 901*b*, the relaying device 122 is also configured by the radio access node 111 to apply the repetitive discontinuous reception scheme of the remote wireless communications device 121 for monitoring of the paging message on the sidelink between the remote wireless communications device 121 and the relaying device 122.

In optional Action 902, the relaying device 122 may relay the configuration to the remote wireless communications device 121. That is, the relaying device 122 may relay the configuration to apply the repetitive discontinuous reception scheme for monitoring of the paging message on the SL. This may be the case if the remote wireless communications device 121 doesn't receive the configuration directly from the radio access node 111 e.g., as in action 901*a*. The configuration may for example comprise the time offset between different paging occasions on the two radio links mentioned above and further explained below.

In Action 903, the radio access node 111 transmits, via the relaying device 122, a paging message to the remote wireless communications device 121 in accordance with the repetitive discontinuous reception scheme of the remote wireless communications device 121.

Further, the relaying device 122 receives the paging message from the radio access node 111 to the remote wireless communications device 121 in accordance with a repetitive discontinuous reception scheme of the remote wireless communications device 121.

In Action 904, the relaying device 122 transmits the paging message to the remote wireless communications device 121, also in accordance with the repetitive discontinuous reception scheme of the remote wireless communications device 121.

Also, in Action 904, the remote wireless communications device 121 monitors for and may receive the paging message on the sidelink between the remote wireless communications device 121 and the relaying device 122 in accordance with the repetitive discontinuous reception scheme of the remote wireless communications device 121.

In this way the remote wireless communications device 121 can reduce power consumption on the SL for paging monitoring, and achieve a good balance between power consumption reduction and QoS satisfaction.

The method will now be described and explained in more detail in the following examples.

In some embodiments the monitoring for the paging message on the SL is further based on a time offset between a first paging occasion, PO, on a radio link between the radio access node and the relaying device 122, such as an Uu link, and a second PO on the SL. The time offset between the first PO and the second PO may be configured, e.g. by the radio access node 111, as a relative time offset, e.g., relative to the first PO, or as an absolute time offset in relation to a global time, e.g. a time of the radio access node 111. In an example, the relaying device 122 derives the timing of the gNB 111 based on the synchronization signal from the gNB 111. The time units of the gNB 111 timing may be in radio frames or sub radio frames. In this case, an absolute time offset may be a positive integer and its time units may be in sub radio frame or OFDM symbols. In NR fourteen OFDM symbols may be comprised in a slot. In NR the number of slots in each sub frame depends on the Subcarrier Spacing (SCS). One subframe may contain 1, 2, 4, 8, 16 slots when the SCS is 15 kHz, 30 kHz, 60 kHz, 120 kHz, and 240 kHz respectively.

Since the remote wireless communications device 121 monitors for the paging message on the SL in accordance with the repetitive discontinuous reception scheme of the remote wireless communications device 121, the second PO on the SL and/or the offset is determined in accordance with the repetitive discontinuous reception scheme of the remote wireless communications device 121. For example, the offset is determined such that the second PO falls within an on-state of the discontinuous reception scheme of the remote wireless communications device 121.

In some embodiments the time offset is a paging frame, PF, offset, also referred to as a PF_offset herein, of the first and second POs. Taking NR as an example, the UE may monitor one PO per DRX cycle. A PO may be a set of PDCCH monitoring occasions and may consist of one or more time slots, e.g., one or more subframes or OFDM symbols, where paging DCI may be sent. One PF is one Radio Frame and may contain one or multiple PO(s) or starting point of a PO. Thus, with NR as the example, the PF offset may be an offset between different PFs, i.e., between different Radio Frames, in which the first and second POs have been configured.

The time offset may be based on a time taken by the relaying device 122 to relay the paging message to the remote wireless communications device 121.

In some embodiments the discontinuous reception scheme comprises a first discontinuous reception scheme associated with a radio link between the remote wireless communications device 121 and the relaying device 122, such as an SL.

In some further embodiments the discontinuous reception scheme comprises a second discontinuous reception scheme associated with a radio link between the radio access node and the relaying device 122, such as a Uu link.

The first discontinuous reception scheme may be configured separately from the second discontinuous reception scheme.

In some other embodiments the first discontinuous reception scheme and the second discontinuous reception scheme share a same configuration for discontinuous reception of paging messages, such as a same paging DRX configuration.

In some embodiments the second PO on the SL is further determined by a time offset in relation to a timing of the radio access node 111. The time offset may also be referred to as a paging time offset as used in the detailed examples below. The Uu link and the SL link may each have a respective timing offset in relation to the timing of the radio access node 111.

That is, the second PO on the SL may be determined in accordance with the repetitive discontinuous reception scheme of the remote wireless communications device 121 as described above and further determined by a time offset in relation to the timing of the radio access node 111. The timing of the radio access node 111 may be a general timing of the radio access node 111. In an example, the time units of the timing may be in sub radio frames or OFDM symbols. In this case, the timing offset may be an integer number of sub radio frames or OFDM symbols.

In some further embodiments the second PO on the SL is further determined by a time offset in relation to a same timing source as the radio link between the radio access node 111 and the relaying device 122, such as a Uu link. In other words, the SL and Uu may share a same timing source, e.g. a third timing source. So, the second PO on the SL may further be determined by a time offset in relation to a timing source for the Uu link, which timing source is shared by the SL. That is, the second PO on the SL may be determined in accordance with the repetitive discontinuous reception scheme of the remote wireless communications device 121 and further determined by a time offset in relation to a same timing source as the radio link between the radio access node 111 and the relaying device 122.

The repetitive discontinuous reception scheme of the remote wireless communications device 121 may comprise a repetitive discontinuous reception scheme for RRC idle state and a separate repetitive discontinuous reception scheme for RRC inactive state.

In some embodiments the repetitive discontinuous reception scheme of the remote wireless communications device 121 is at least partly aligned with a further repetitive discontinuous reception scheme of the remote wireless communications device 121 for non-relay traffic exchanged between the remote wireless communications device and the relaying device.

Further Detailed Examples

In the embodiments below the remote wireless device 121 will be exemplified with a remote UE 121, the radio access node 111 will be exemplified with a gNB 111, and the relaying device 122 will be exemplified with a relay UE 122.

The embodiments are described in the context of NR, i.e., the remote UE 121 and the relay UE 122 are located in a same NR cell, such as cell 115, or in different NR cells. The embodiments are also applicable to other relay scenarios including UE to network (U2N) relay or UE to UE (U2U) relay where the link between the remote UE 121 and the relay UE 122 may be based on LTE sidelink or NR sidelink. The Uu connection between the relay UE 122 and base station, such as the gNB 111, may be LTE Uu or NR Uu. A relay scenario containing multiple relay hops is also covered. The connection between remote UE 121 and relay UE 122 is also not limited to sidelink. Any short-range communication technology such as Wifi is equally applicable.

The embodiments are also applicable to a relay scenario where the relay UE 122 is configured with multiple connections—i.e., the number of connections is equal or larger than two—to the RAN, e.g., as applied for dual connectivity, carrier aggregation etc.

The embodiments are applicable to L2 relay scenarios.

In some first embodiments, a DRX mechanism is introduced on a SL between the remote UE 121 and the relay UE 122 for paging monitoring for the remote UE 121. Based on the DRX mechanism, the remote UE 121 only monitors paging on the SL during paging active occasions, e.g., referred as to POs. During other time periods, e.g., no PO periods, the remote UE 121 does not need to monitor paging on the SL. If there are no other transmissions on the SL, the remote UE 121 can go to sleep mode.

In some second embodiments, similar as for paging DRX configuration for the Uu link, the paging DRX configuration for the remote UE 121 on the SL may be determined as described below. In a relay scenario, since the paging message cannot be directly sent by the gNB 111 to the remote UE 121 on a PO, SL paging DRX would then apply a different PF_offset compared to the paging DRX configuration for the Uu link. The PF_offset may consider the time taken by the relay UE to relay the paging message. As mentioned above, the PF offset may be an offset between different PFs, i.e., between different Radio Frames, in which the first and second POs have been configured.

As mentioned above, the remote UE 121 monitors one paging occasion (PO) per DRX cycle. A PO is a set of PDCCH monitoring occasions and may consist of multiple time slots, e.g. multiple subframes or OFDM symbols, where the paging DCI may be sent. One PF is one Radio Frame and may contain one or multiple PO(s) or starting point of a PO.

The PF and PO for paging are determined by the following formulae:

SFN for the PF is determined by:

$$(SFN + PF\_\text{offset}) \bmod T = (T \operatorname{div} N) * (UE\_ID \bmod N)$$

Index (i_s), indicating the index of the PO is determined by:

$$i\_s = \operatorname{floor}(UE\_ID/N) \bmod Ns$$

The following parameters are used for the calculation of PF and i_s above:

T: DRX cycle of the UE (T is determined by the shortest of the UE specific DRX value(s), if configured by RRC and/or upper layers, and a default DRX value broadcast in system information. In RRC_IDLE state, if UE specific DRX is not configured by upper layers, the default value is applied).

N: number of total paging frames in T

Ns: number of paging occasions for a PF

PF_offset: offset used for PF determination, e.g., in paging frames

UE_ID: 5G-S-TMSI mod 1024

In some third embodiments, the remote UE 121 may be also configured with a paging DRX configuration for the Uu link, i.e., the Uu link between the relay UE 122 and the serving gNB 111 in addition to being configured with a paging DRX configuration for the SL. So, the serving gNB 11 may send a paging message to the remote UE 121 via the relay UE 122 during the remote UE's POs on the Uu link. The remote UE 121 then starts to monitor the SL for relayed paging message during POs on the SL. A time offset, such as a paging time offset, between POs on the Uu link and POs on the SL may be configured to the remote UE 121. The remote UE 121 uses this time offset to determine the subsequent POs on the SL for each PO on the Uu link. The paging time offset may be configured by the gNB 111 or a controlling UE. The controlling UE may be a special UE role, capable of scheduling other UEs. The paging time offset may be a semi-static value, or dynamically updated.

Figure 10:
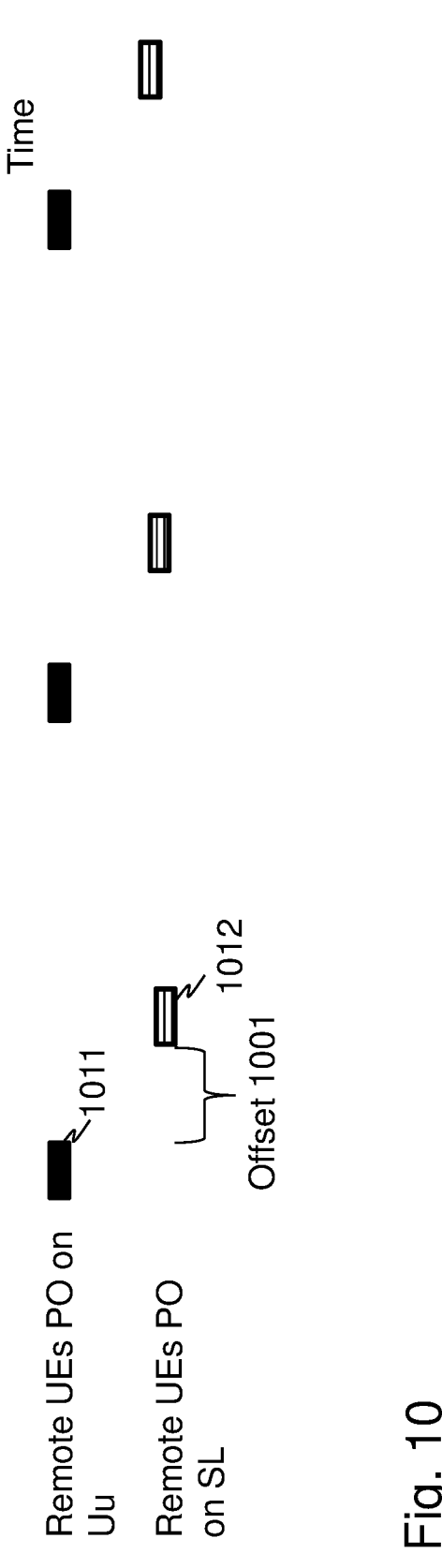

FIG. 10 illustrates an example configuration of POs on Uu and SL with a time offset between the POs on Uu and SL, such as a time offset 1001 between a first PO 1011 on the radio link between the radio access node 111 and the relaying device 122, and a second PO 1012 on the SL. As mentioned above, the time offset 1001 may be the above-mentioned PF offset which may be the offset between different PFs, i.e., between different Radio Frames, in which the first and second POs have been configured.

The time offset may depend on whether the relay UE 122 just forwards the paging message, e.g. requiring a small offset, or if the relay UE 122 decodes the paging message to see whether or not it is for the remote UE 121, which may require a larger offset, before the relay UE 122 forwards the paging message in case it is for the remote UE 121.

In an example, the paging offset is a semi-static value. After reception of a paging message from the gNB 111 during a PO, the relay UE 122 waits for a time corresponding to the offset after the PO, the relay UE 122 may then start to relay the paging message to the remote UE 121 using a configured grant on the SL. At determined subsequent POs on the SL, the remote UE 121 monitors the paging message. The grant on the SL may be configured by the gNB 111.

In another example, the paging time offset is a time value configured by the gNB 111 considering possible scheduling time that the gNB 111 would take to assign a dynamic grant to the relay UE 122. In this case, the gNB 111 knows that the relay UE 122 will need a dynamic grant on the SL to transmit the paging message to the remote UE 121. After transmission of the paging message to the relay UE 122, the gNB 11 may therefore schedule a dynamic grant to the relay UE 122 for the purpose of forwarding the paging message. The time offset may be equal to the time taken by the gNB 111 to schedule the dynamic grant, i.e., a time period from the time when the gNB 111 starts to schedule the relay UE 122 until the time when the relay UE 122 receives the dynamic grant. Alternatively, the gNB 111 may schedule a grant to the relay UE 122 before transmission of the paging message, in this case, the time offset could be minimized, i.e., the relay UE 122 relays the paging message immediately in the next TTI/slot after receiving it, if the relay UE 122 doesn't need to decode the paging message. After reception of a paging message from the gNB 111 during a first PO for the relay UE 122, the relay UE 122 waits for a time corresponding to the offset after the first PO, and the relay UE 122 may start to relay the paging message to the remote UE 121 using the dynamic grant on the SL. At determined subsequent POs on the SL, the remote UE 121 monitors the paging message. As in the previous example, the offset between the subsequent POs and the first PO may also consider the process time for the relay UE 122 if the relay UE 122 needs to decode the paging message.

In some fourth embodiments, the remote UE 121 is configured with a paging DRX configuration for the Uu link, i.e., the Uu link between the relay UE 122 and the serving gNB 111. So, the serving gNB 111 may send a paging message to the remote UE 121 via the relay UE 122 during the remote UE's POs on the Uu link as described above for the third embodiments, e.g. during some first POs on the Uu link. However, for the fourth embodiments the remote UE 121 is not configured with a specific paging DRX configuration for the SL. Rather the remote UE 121 uses a paging time offset to determine the subsequent second POs on the SL for each first PO on the Uu link. The paging time offset may be configured by the gNB 111 or a controlling UE using the same methodologies described in the third embodiment. The time offset may be a semi-static value, or dynamically updated.

In some fifth embodiments, except potential paging messages relayed by the relay UE 122, the remote UE 121 may also have other non-relay traffic being exchanged between the remote UE 121 and the relay UE 122. In order to reduce power consumption for those non-relay traffic on the SL, the remote UE 121 may be also configured with another DRX configuration on the SL for non-relay traffic. In this case, the paging DRX configuration and other non-paging DRX configuration may be aligned to some extent. In other words, POs according to the paging DRX configuration may be fully or partly overlapped with ON durations according to the non-paging DRX configuration.

In some sixth embodiments, the remote UE 121 is configured with at least one paging DRX configuration or paging time offset for the SL in case the remote UE 121 is in RRC IDLE state. The remote UE 121 is also configured with at least one paging DRX configuration or paging time offset for the SL in case the remote UE 121 is in RRC INACTIVE state. Thus, the remote UE 121 may be configured with different DRX configurations or paging time offsets for different connection management states. For example, there may be two different paging DRX configurations or paging time offsets for the SL, a first for RRC IDLE state and a second for RRC INACTIVE state.

In some seventh embodiments, the remote UE 121 is configured with multiple paging DRX configurations or paging time offsets. Each paging DRX configuration or paging time offset is associated with a different service, traffic type, or paging purpose. The remote UE 121 applies a suitable paging DRX configuration or paging time offset according to its current service, traffic type or paging purpose.

Figure 11:
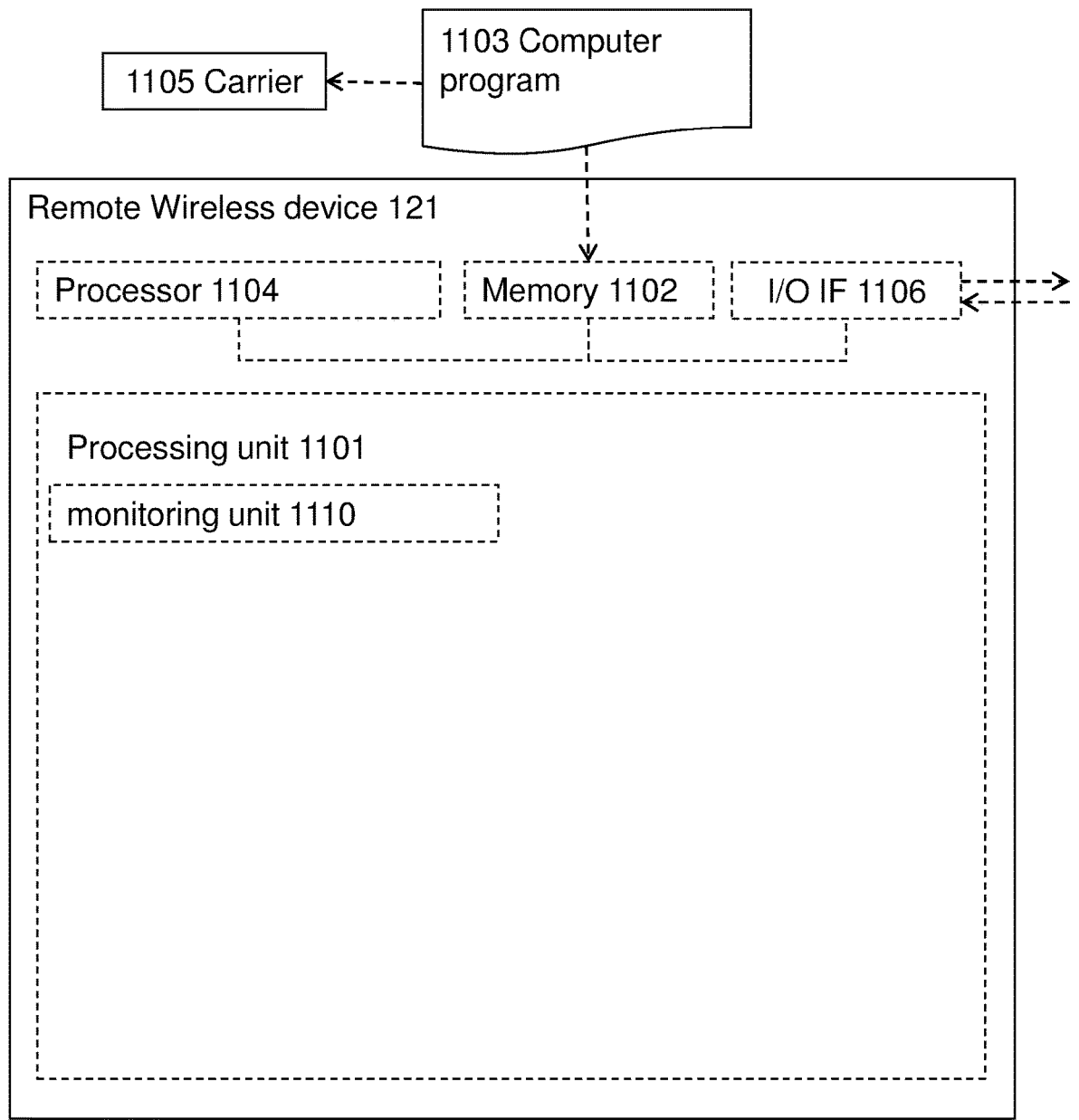
FIG. 11 is a block diagram schematically illustrating a remote wireless device according to embodiments herein.
Figure 12:
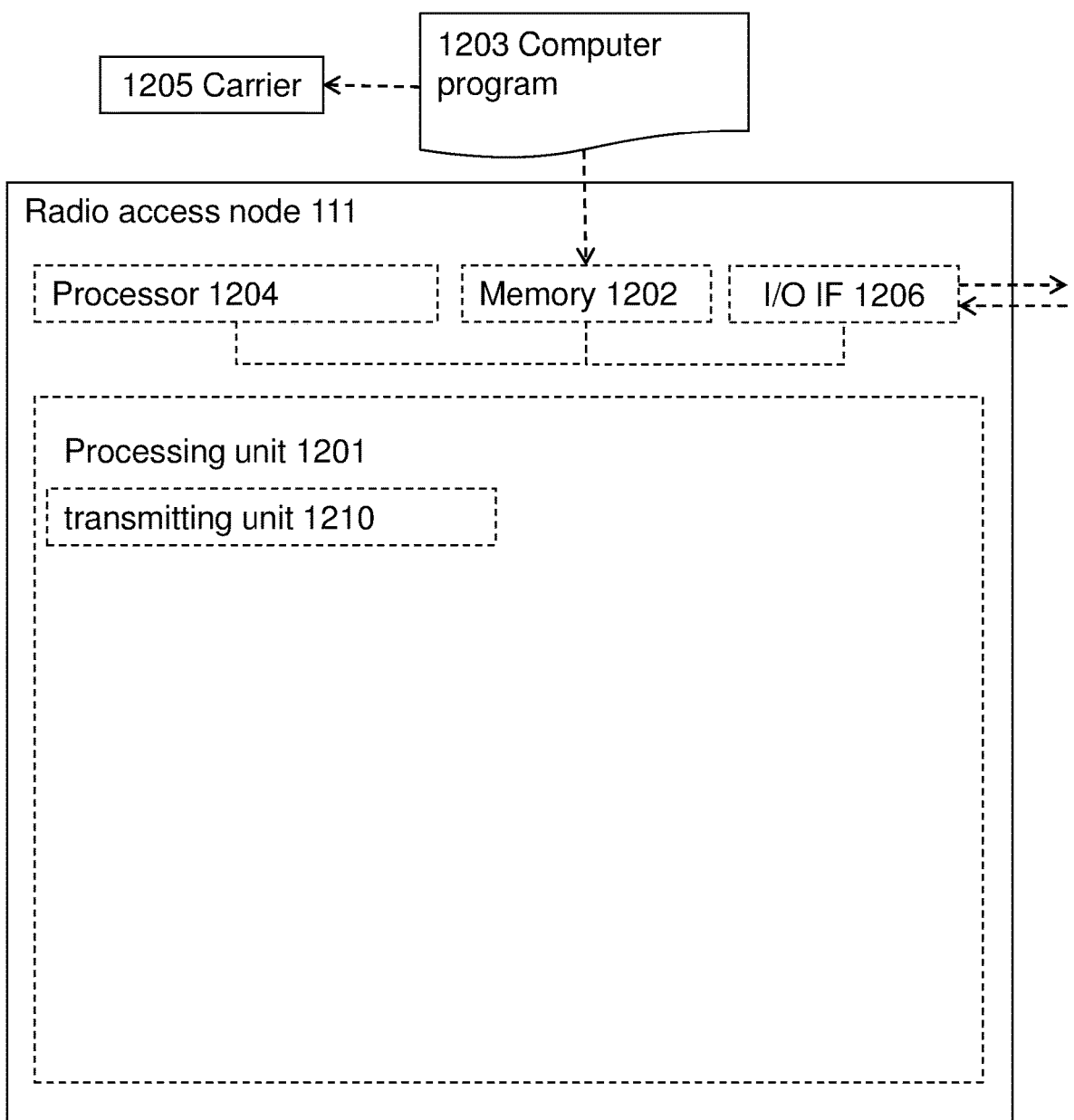
FIG. 12 is a block diagram schematically illustrating a radio access node according to embodiments herein.
Figure 13:
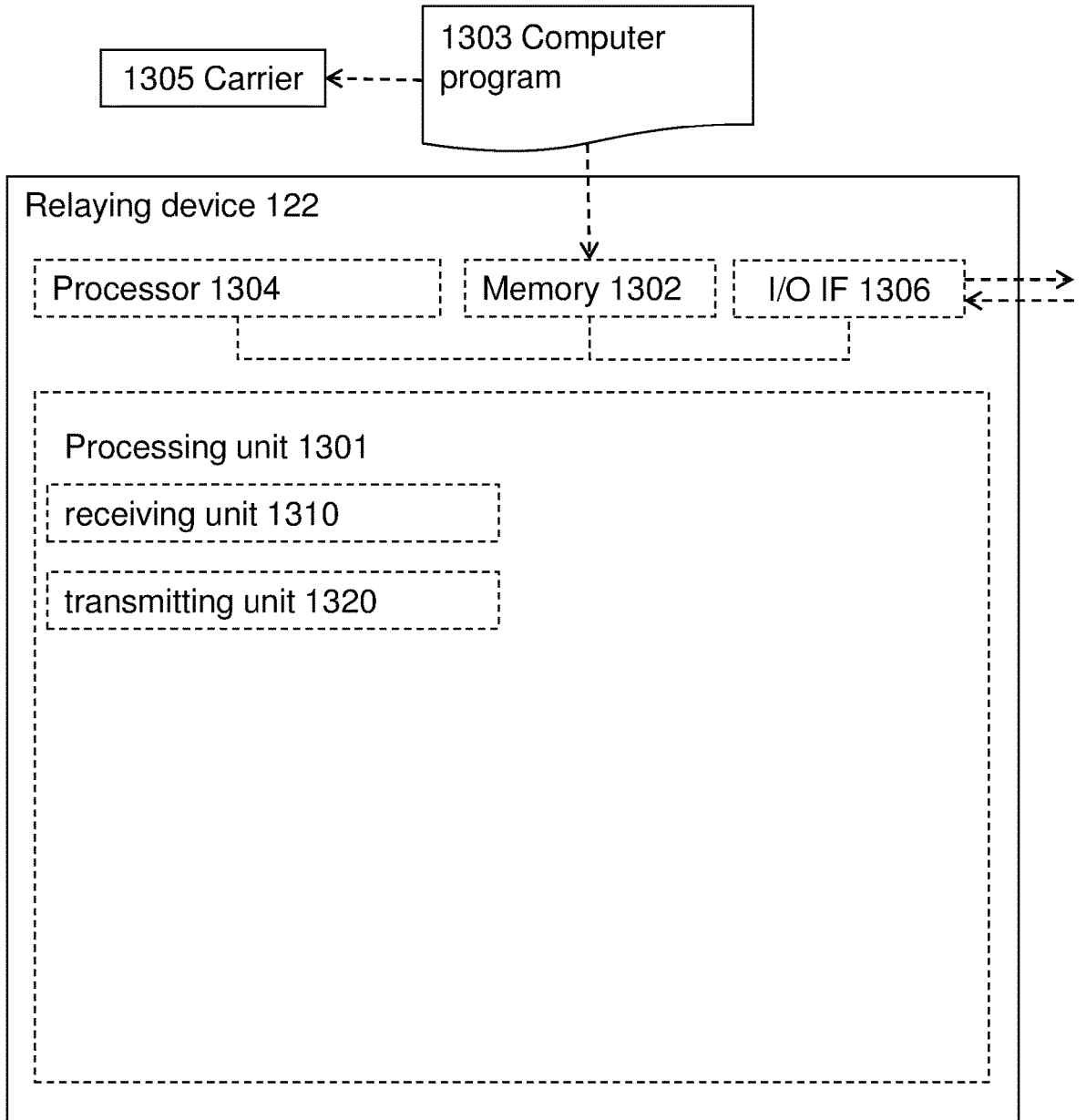
FIG. 13 is a block diagram schematically illustrating a relaying device according to embodiments herein, FIG. 16 schematically illustrates a telecommunication network connected via an intermediate network to a host computer.

FIG. 11 shows an example of the remote wireless device 121, FIG. 12 shows an example of the radio access node 111, and FIG. 13 shows an example of the relaying device 122.

The remote wireless device 121, the radio access node 111, and the relaying device 122 may comprise a respective input and output interface, IF, 1106, 1206, 1306 configured to communicate with each other, see FIGS. 11-13. The input and output interface may comprise a wireless receiver (not shown) and a wireless transmitter (not shown).

The remote wireless device 121 may further comprise a monitoring unit 1110, see FIG. 11.

The remote wireless device 121 is configured to, e.g., by means of the monitoring unit 1110, monitor for the paging message on the sidelink between the remote wireless communications device 121 and the relaying device 122 in accordance with the repetitive discontinuous reception scheme of the remote wireless communications device 121.

The remote wireless device 121 may further be configured to, e.g., by means of the monitoring unit 1110 and/or the IF 1106, receive the paging message on the sidelink in accordance with the repetitive discontinuous reception scheme of the remote wireless communications device 121.

The radio access node 111 may further comprise a transmitting unit 1210, see FIG. 12.

The radio access node 111 is configured to, e.g., by means of the transmitting unit 1210, transmit via the relaying device 122, the paging message to the remote wireless communications device 121 in accordance with the repetitive discontinuous reception scheme of the remote wireless communications device 121.

The relaying device 122 may further comprise a receiving unit 1310, and a transmitting unit 1320, see FIG. 13.

The relaying device 122 is configured to, e.g., by means of the receiving unit 1310, receive the paging message from the radio access node 111 to the remote wireless communications device 121 in accordance with the repetitive discontinuous reception scheme of the remote wireless communications device 121. The relaying device 122 is further configured to, e.g., by means of the transmitting unit 1320, transmit the paging message to the remote wireless communications device 121 in accordance with the repetitive discontinuous reception scheme of the remote wireless communications device 121.

The embodiments herein may be implemented through a respective processor or one or more processors, such as the respective processor 1104, 1204 and 1304, of a processing circuitry in the remote wireless device 121, the radio access node 111, and the relaying device 122, and depicted in FIGS. 11-13 together with computer program code for performing the functions and actions of the embodiments herein. The program code mentioned above may also be provided as a computer program product, for instance in the form of a data carrier carrying computer program code for performing the embodiments herein when being loaded into the respective remote wireless device 121, radio access node 111 and relaying device 122. One such carrier may be in the form of a CD ROM disc. It is however feasible with other data carriers such as a memory stick. The computer program code may furthermore be provided as pure program code on a server and downloaded to the respective remote wireless device 121, radio access node 111 and relaying device 122.

The remote wireless device 121, the radio access node 111 and the relaying device 122 may further comprise a respective memory 1102, 1202, and 1302 comprising one or more memory units. The memory comprises instructions executable by the respective processor 1104, 1204, 1304 in the radio access node 111, the relaying device 122 and the remote wireless device 121.

Each respective memory 1102, 1202 and 1302 is arranged to be used to store e.g. information, data, configurations, and applications to perform the methods herein when being executed in the respective remote wireless device 121, radio access node 111 and relaying device 122.

In some embodiments, a respective computer program 1103, 1203 and 1303 comprises instructions, which when executed by the at least one processor, cause the at least one processor of the respective remote wireless device 121, radio access node 111 and relaying device 122 to perform the actions above.

In some embodiments, a respective carrier 1105, 1205 and 1305 comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the units in the units described above may refer to a combination of analog and digital circuits, and/or one or more processors configured with software and/or firmware, e.g. stored in the respective remote wireless device 121, radio access node 111 and relaying device 122, that when executed by the respective one or more processors, such as the processor 1104, 1204, 1304, described above causes the respective remote wireless device 121, radio access node 111 and relaying device 122 to perform the method actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

As used herein, the term "unit" may refer to one or more functional units, each of which may be implemented as one or more hardware units and/or one or more software units and/or a combined software/hardware unit. In some examples, the unit may represent a functional module realized as software and/or hardware.

As used herein, the term "carrier", which also may be referred to as a "computer program carrier" or "program carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing unit" may include one or more hardware units, one or more software units or a combination thereof. Any such unit, be it a hardware, software or a combined hardware-software unit, may be a transmitting means, receiving means, monitoring means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing unit" or "processing circuit" may herein encompass a processing module, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

NUMBERED EMBODIMENTS

1. A method for paging performed by a remote wireless communications device 121, such as a remote UE, wherein the remote wireless communications device 121 is configured to communicate with a radio access node 111, via a relaying device 122, such as a relaying UE, the method comprises:
   Monitoring 904 for a paging message on a sidelink, SL, between the remote wireless communications device 121 and the relaying device 122 in accordance with a repetitive discontinuous reception scheme, such as a DRX scheme, of the remote wireless communications device 121.

2. The method according to embodiment 1, wherein the monitoring for the paging message on the SL is further based on a time offset 1001 between a first paging occasion, PO, 1011 on a radio link between the radio access node and the relaying device 122, such as an Uu link, and a second PO 1012 on the SL.

3. The method according to embodiment 2, wherein the time offset 1001 is based on a time taken by the relaying device 122 to relay the paging message to the remote wireless communications device 121.

4. The method according to embodiments 1-3, wherein the discontinuous reception scheme comprises a first discontinuous reception scheme associated with a radio link between the remote wireless communications device 121 and the relaying device 122, such as an SL.

5. The method according to embodiments 1-4, wherein the discontinuous reception scheme comprises a second discontinuous reception scheme associated with a radio link between the radio access node and the relaying device 122, such as a Uu link.

6. The method according to embodiment 5, wherein the first discontinuous reception scheme is configured separately from the second discontinuous reception scheme.

7. The method according to embodiment 5, wherein the first discontinuous reception scheme and the second discontinuous reception scheme share a same configuration for discontinuous reception of paging messages, such as a same paging DRX configuration.

8. The method according to embodiments 2-7, wherein the second PO on the SL is further determined by a time offset in relation to a timing of the radio access node.

9. The method according to embodiments 2-7, wherein the second PO on the SL is further determined by a time offset in relation to a same timing source as the radio link between the radio access node 111 and the relaying device 122, such as a Uu link.

10. The method according to embodiments 1-9, wherein the repetitive discontinuous reception scheme of the remote wireless communications device 121 comprises a repetitive discontinuous reception scheme for RRC idle state and a separate repetitive discontinuous reception scheme for RRC inactive state.

11. The method according to embodiments 1-10, wherein the repetitive discontinuous reception scheme of the remote wireless communications device 121 is at least partly aligned with a further repetitive discontinuous reception scheme of the remote wireless communications device 121 for non-relay traffic exchanged between the remote wireless communications device and the relaying device.

12. A computer program comprising instructions, which when executed by a processor, causes the processor to perform actions according to any of the embodiment 1-11.

13. A carrier comprising the computer program of embodiment 12, wherein the carrier is one of an electronic signal, an optical signal, an electromagnetic signal, a magnetic signal, an electric signal, a radio signal, a microwave signal, or a computer-readable storage medium.

14. A remote wireless communications device 121, such as a remote UE, configured to communicate with a radio access node 111, via a relaying device 122, such as a relaying UE, the remote wireless communications device 121 further being configured to:
   monitor for a paging message on a sidelink, SL, between the remote wireless communications device 121 and the relaying device 122 in accordance with a repetitive discontinuous reception scheme, such as a DRX scheme, of the remote wireless communications device 121, e.g. by means of a monitoring unit 1110 in the remote wireless communications device 121.

15. The remote wireless communications device 121 according to embodiment 14, further configured to monitor for the paging message on the SL based on a time offset 1001 between a first paging occasion, PO, 1011 on a radio link between the radio access node and the relaying device 122, such as an Uu link, and a second PO 1012 on the SL.

16. The remote wireless communications device 121 according to embodiment 15, wherein the time offset is based on a time taken by the relaying device 122 to relay the paging message to the remote wireless communications device 121.

17. The remote wireless communications device 121 according to embodiments 15-16, wherein the discontinuous reception scheme comprises a first discontinuous reception scheme associated with a radio link between the remote wireless communications device 121 and the relaying device 122, such as an SL.

18. The remote wireless communications device 121 according to embodiments 14-17, wherein the discontinuous reception scheme comprises a second discontinuous reception scheme associated with a radio link between the radio access node and the relaying device 122, such as a Uu link.

19. The remote wireless communications device 121 according to embodiment 18, wherein the first discontinuous reception scheme is configured separately from the second discontinuous reception scheme.

20. The remote wireless communications device 121 according to embodiment 18, wherein the first discontinuous reception scheme and the second discontinuous reception scheme share a same configuration for discontinuous reception of paging messages, such as a same paging DRX configuration.

21. The remote wireless communications device 121 according to embodiments 15-20, wherein the second PO 1012 on the SL is further determined by a time offset in relation to a timing of the radio access node 111.

22. The remote wireless communications device 121 according to embodiments 15-20, wherein the second PO 1012 on the SL is further determined by a time offset in relation to a same timing source as the radio link between the radio access node 111 and the relaying device 122, such as a Uu link.

23. The remote wireless communications device 121 according to embodiments 13-22, wherein the repetitive discontinuous reception scheme of the remote wireless communications device 121 comprises a repetitive discontinuous reception scheme for RRC idle state and a separate repetitive discontinuous reception scheme for RRC inactive state.

24. The remote wireless communications device 121 according to embodiments 13-23, wherein the repetitive discontinuous reception scheme of the remote wireless communications device 121 is at least partly aligned with a further repetitive discontinuous reception scheme of the remote wireless communications device 121 for non-relay traffic exchanged between the remote wireless communications device and the relaying device.

25. A method for paging a remote wireless communications device 121 performed by a radio access node, wherein the radio access node is configured to communicate with the remote wireless communications device 121 via a relaying device 122, the method comprises:

Transmitting, via the relaying device 122, a paging message to the remote wireless communications device 121 in accordance with a repetitive discontinuous reception scheme, such as a DRX scheme, of the remote wireless communications device 121.

26. A computer program comprising instructions, which when executed by a processor, causes the processor to perform actions according to embodiment 25.

27. A carrier comprising the computer program of embodiment 26, wherein the carrier is one of an electronic signal, an optical signal, an electromagnetic signal, a magnetic signal, an electric signal, a radio signal, a microwave signal, or a computer-readable storage medium.

28. A radio access node 111, such as a gNB, configured to communicate with a remote wireless communications device 121 via a relaying device 122, such as a relaying UE, the radio access node 111 further being configured to:

transmit via the relaying device 122, a paging message to the remote wireless communications device 121 in accordance with a repetitive discontinuous reception scheme, such as a DRX scheme, of the remote wireless communications device 121, e.g. by means of a transmitting unit 1210 in the radio access node 111.

29. A method for paging a remote wireless communications device 121 performed by a relaying device 122, wherein the relaying device 122 is configured to relay a paging message from a radio access node to the remote wireless communications device 121, the method comprises:

receiving a paging message from the radio access node to the remote wireless communications device 121 in accordance with a repetitive discontinuous reception scheme, such as a DRX scheme, of the remote wireless communications device 121, and transmitting the paging message to the remote wireless communications device 121 in accordance with the repetitive discontinuous reception scheme, such as a DRX scheme, of the remote wireless communications device 121.

30. The method according to embodiment 29, wherein the discontinuous reception scheme comprises a first discontinuous reception scheme associated with a radio link between the remote wireless communications device 121 and the relaying device 122, such as an SL, and wherein the discontinuous reception scheme further comprises a second discontinuous reception scheme associated with a radio link between the radio access node and the relaying device 122, such as a Uu link.

31. The method according to embodiment 30, wherein a first paging occasion 1011 of the first discontinuous reception scheme is offset to a second paging occasion 1012 of the second discontinuous reception scheme.

32. A computer program comprising instructions, which when executed by a processor, causes the processor to perform actions according to any of the embodiment 29-31.

33. A carrier comprising the computer program of embodiment 32, wherein the carrier is one of an electronic signal, an optical signal, an electromagnetic signal, a magnetic signal, an electric signal, a radio signal, a microwave signal, or a computer-readable storage medium.

34. A relaying device 122 configured to relay a paging message from a radio access node to a remote wireless communications device 121, the relaying device 122 further being configured to:

Receive a paging message from the radio access node to the remote wireless communications device 121 in accordance with a repetitive discontinuous reception scheme, such as a DRX scheme, of the remote wireless communications device 121, e.g. by means of a receiving unit 1310 in the relaying device 122, and Transmit the paging message to the remote wireless communications device 121 in accordance with the repetitive discontinuous reception scheme, such as a DRX scheme, of the remote wireless communications device 121, e.g. by means of a transmitting unit 1320 in the relaying device 122.

It should be noted that there are no FIGS. 14-15.

Figure 16:
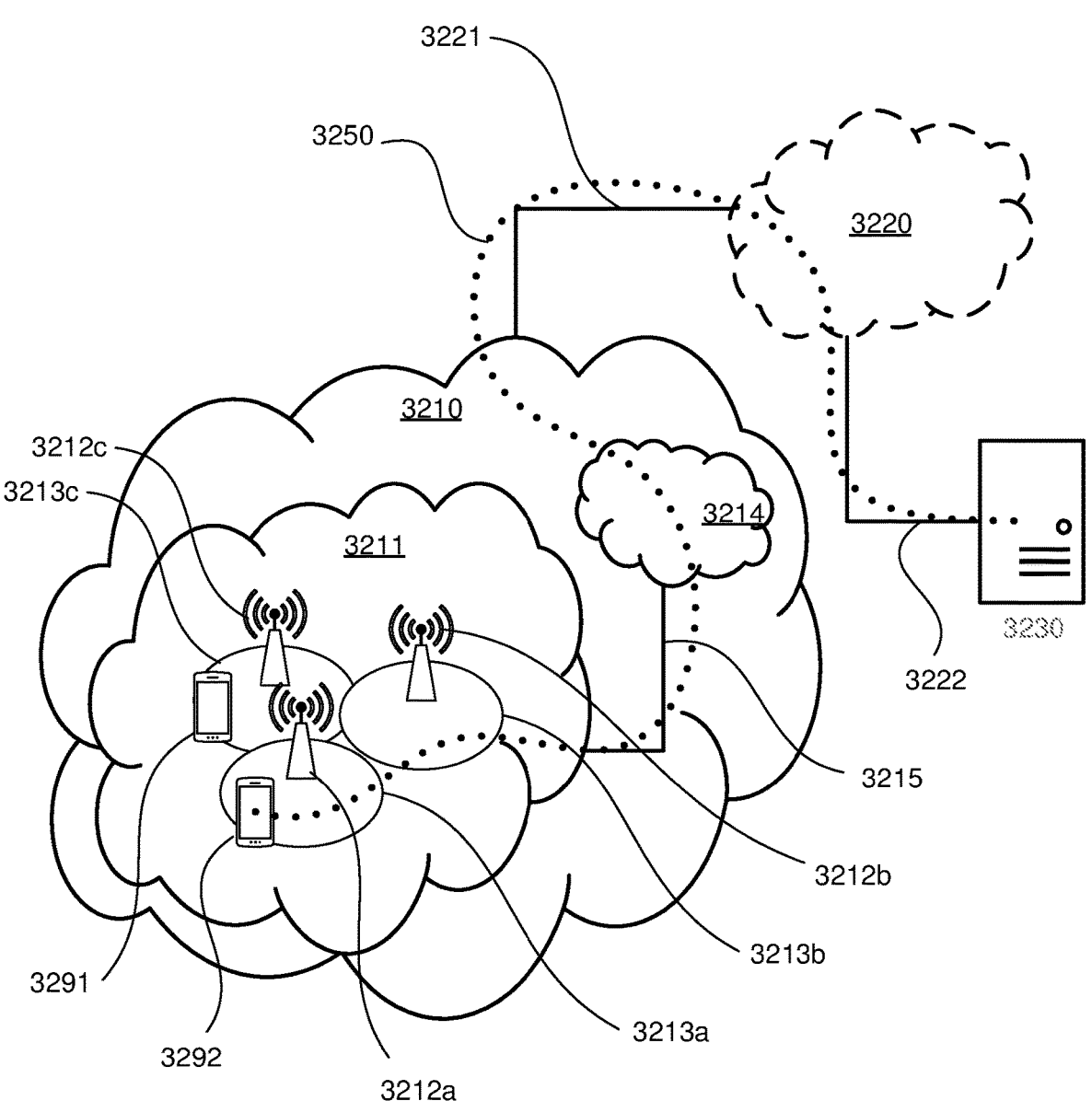

With reference to FIG. 16, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as the source and target access node 111, 112, AP STAs NBs, eNBs, gNBs or other types of wireless access points, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) such as a Non-AP STA 3291 located in coverage area 3213*c* is configured to wirelessly connect to, or be paged by, the corresponding base station 3212*c*. A second UE 3292 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 16 as a whole enables connectivity between one of the connected UEs 3291, 3292 such as e.g. the UE 121, and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230. Example implementations, in accordance with an embodiment, of the UE, base station and host computer discussed in the preceding paragraphs will now be described with reference to FIG. 17. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 17) served by the base station 3320. The communication interface 3326 may be configured to facilitate a connection 3360 to the host computer 3310. The connection 3360 may be direct or it may pass through a core network (not shown in FIG. 17) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides. It is noted that the host computer 3310, base station 3320 and UE 3330 illustrated in FIG. 17 may be identical to the host computer 3230, one of the base stations 3212*a*, 3212*b*, 3212*c* and one of the UEs 3291, 3292 of FIG. 16, respectively. This is to say, the inner workings of these entities may be as shown in FIG. 17 and independently, the surrounding network topology may be that of FIG. 16.

Figure 17:
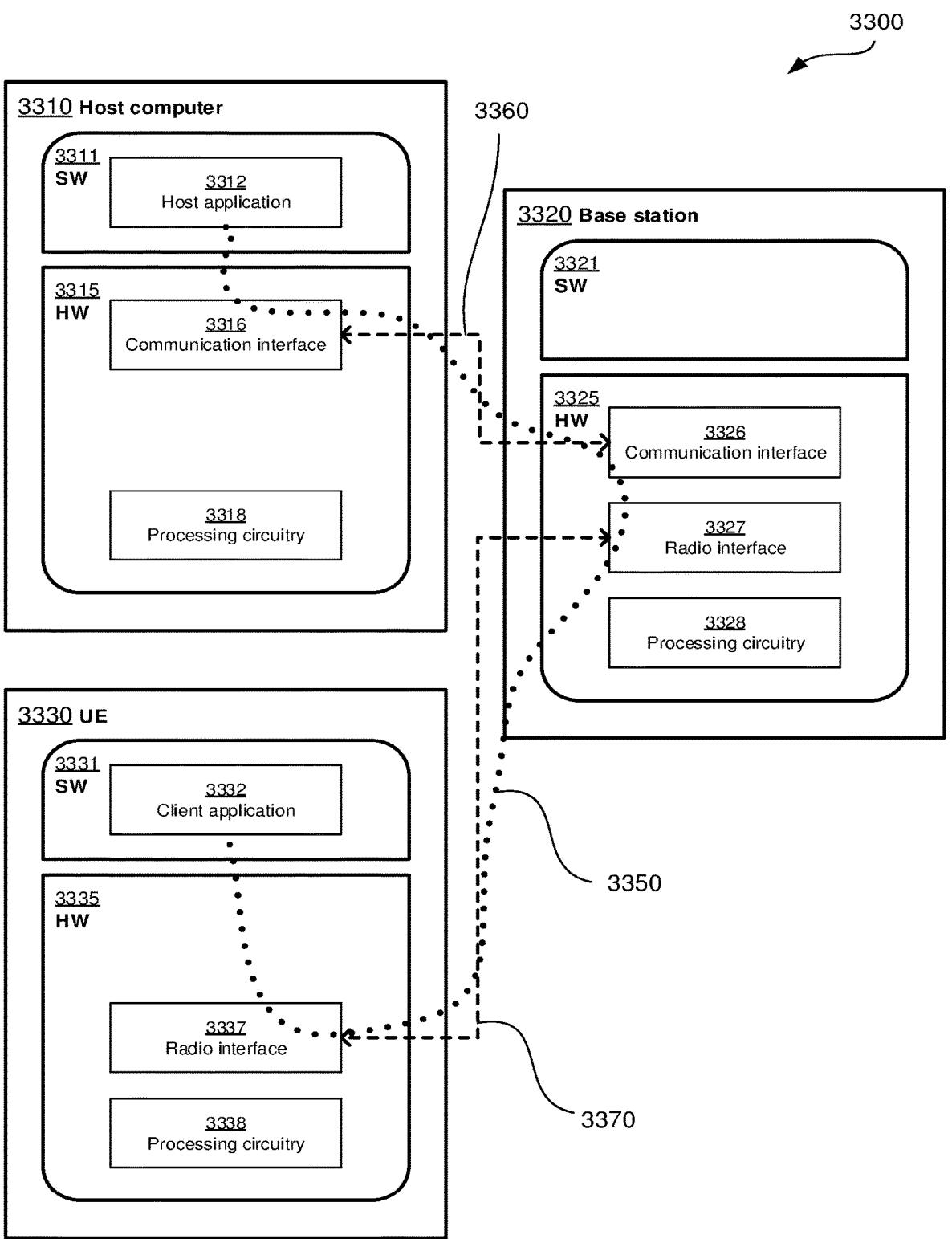
FIG. 17 is a generalized block diagram of a host computer communicating via a base station with a user equipment over a partially wireless connection.

In FIG. 17, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 18, 19:
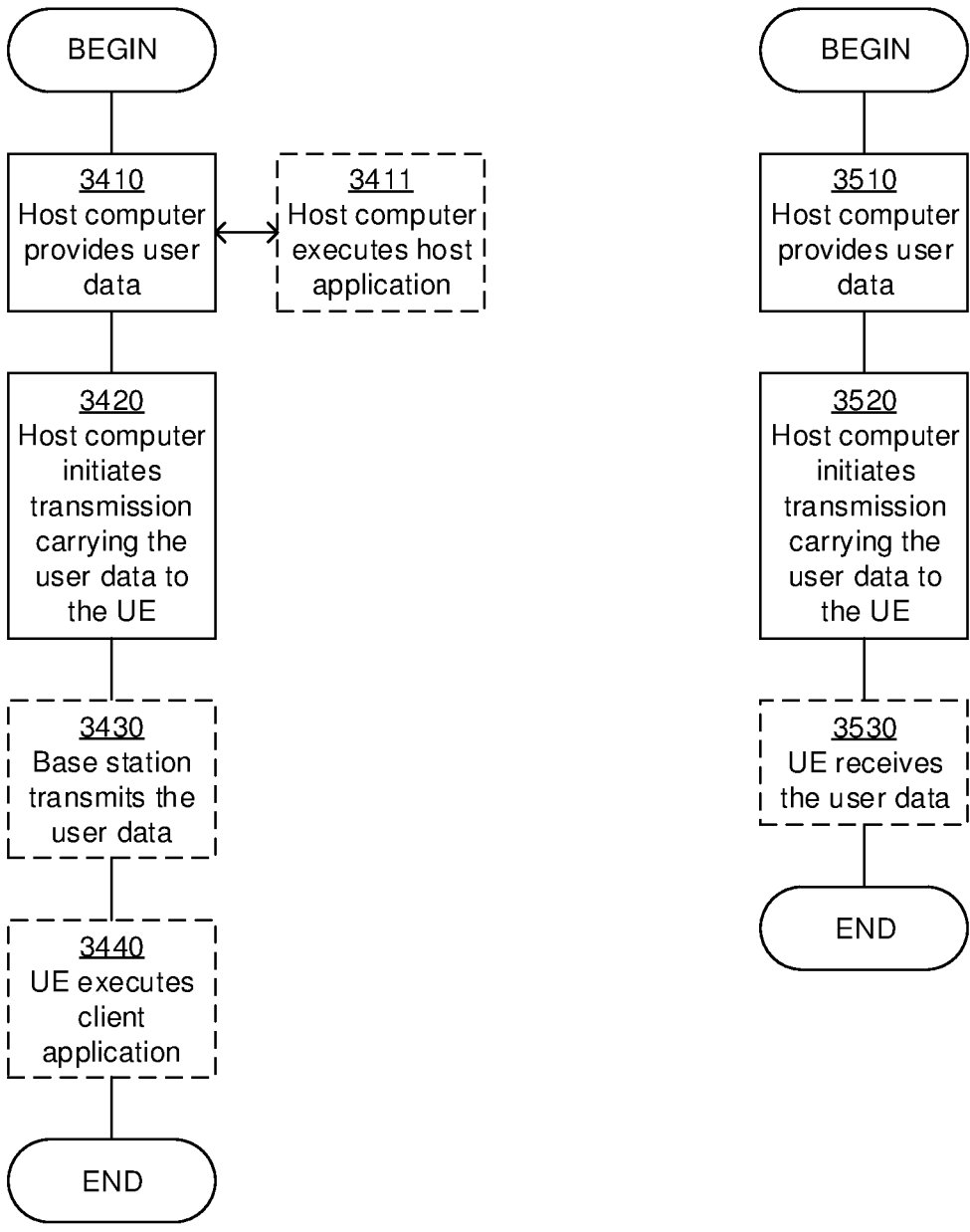
FIGS. 18 to 21 are flowcharts illustrating methods implemented in a communication system including a host computer, a base station and a user equipment.

FIG. 18 is a flowchart illustrating a method implemented in a communication system, in accordance with one embodiment. The communication system includes a host computer, a base station such as a AP STA, and a UE such as a Non-AP STA which may be those described with reference to FIG. 16 and FIG. 17. For simplicity of the present disclosure, only drawing references to FIG. 18 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 19 is a flowchart illustrating a method implemented in a communication system, in accordance with one embodiment. The communication system includes a host computer, a base station such as a AP STA, and a UE such as a Non-AP STA which may be those described with reference to FIG. 16 and FIG. 17. For simplicity of the present disclosure, only drawing references to FIG. 19 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

Figures 20, 21:
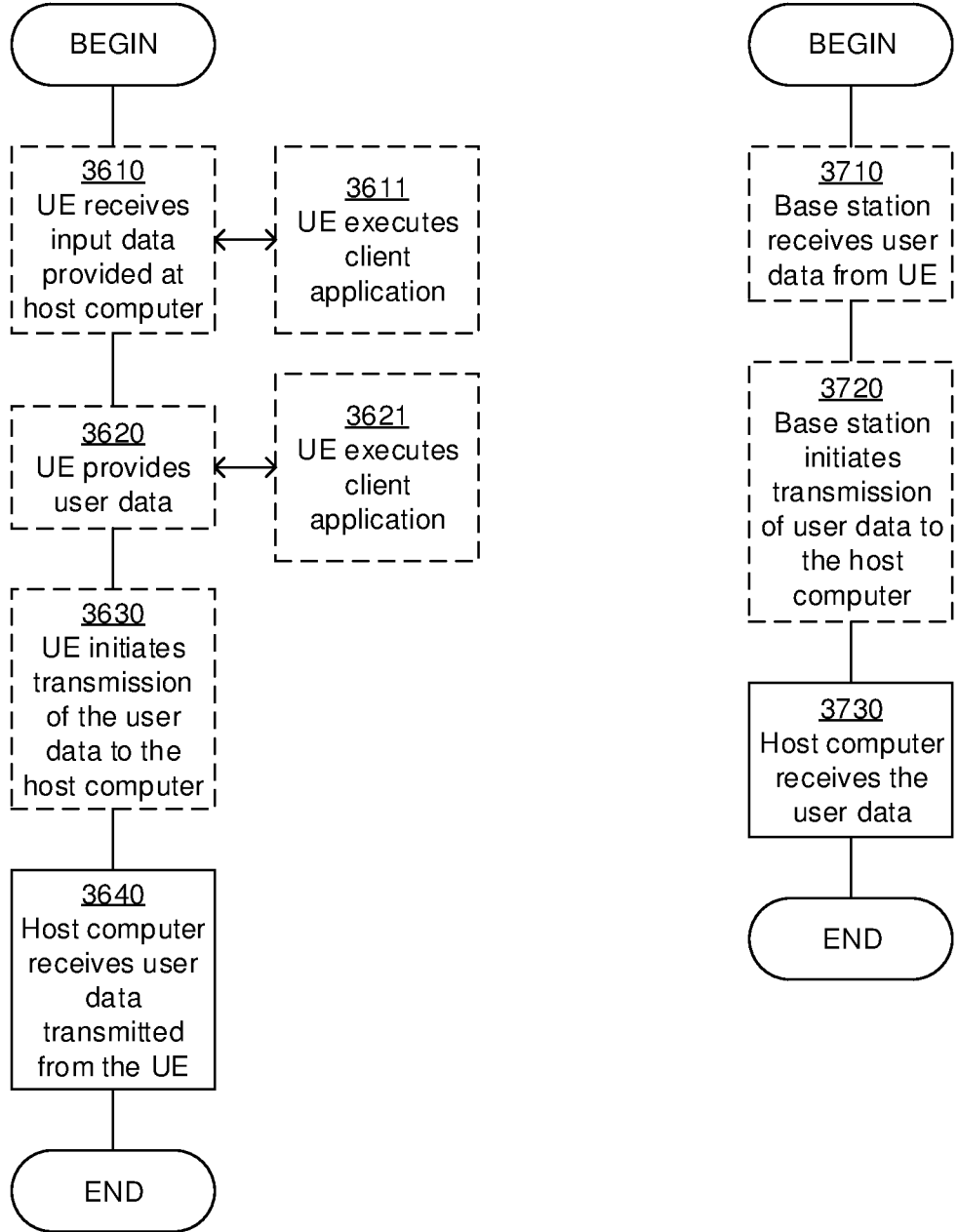

FIG. 20 is a flowchart illustrating a method implemented in a communication system, in accordance with one embodiment. The communication system includes a host computer, a base station such as a AP STA, and a UE such as a Non-AP STA which may be those described with reference to FIG. 16 and FIG. 17. For simplicity of the present disclosure, only drawing references to FIG. 20 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 21 is a flowchart illustrating a method implemented in a communication system, in accordance with one embodiment. The communication system includes a host computer, a base station such as a AP STA, and a UE such as a Non-AP STA which may be those described with reference to FIGS. 32 and 33. For simplicity of the present disclosure, only drawing references to FIG. 21 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

The invention claimed is:

1. A method for paging performed by a remote wireless communications device, wherein the remote wireless communications device is configured to communicate with a radio access node, via a relaying device, the method comprises:

based on a time offset between a first paging occasion, PO, on a radio link between the radio access node and the relaying device and a second PO on a sidelink, SL, between the remote wireless communications device and the relaying device, monitoring for a paging message on the SL between the remote wireless communications device and the relaying device in accordance with a repetitive discontinuous reception scheme of the remote wireless communications device, wherein the time offset is based on a time taken by the relaying device to relay the paging message to the remote wireless communications device.

2. The method according to claim 1, wherein the discontinuous reception scheme comprises a first discontinuous reception scheme associated with a radio link between the remote wireless communications device and the relaying device.

3. The method according to claim 2, wherein the discontinuous reception scheme comprises a second discontinuous reception scheme associated with a radio link between the radio access node and the relaying device.

4. The method according to claim 3, wherein the first discontinuous reception scheme is configured separately from the second discontinuous reception scheme.

5. The method according to claim 3, wherein the first discontinuous reception scheme and the second discontinuous reception scheme share a same configuration for discontinuous reception of paging messages.

6. The method according to claim 1, wherein the second PO on the SL is further determined by a time offset in relation to a timing of the radio access node.

7. The method according to claim 1, wherein the second PO on the SL is further determined by a time offset in relation to a same timing source as the radio link between the radio access node and the relaying device.

8. The method according to claim 1, wherein the repetitive discontinuous reception scheme of the remote wireless communications device comprises a repetitive discontinuous reception scheme for RRC idle state and a separate repetitive discontinuous reception scheme for RRC inactive state.

9. The method according to claim 1, wherein the repetitive discontinuous reception scheme of the remote wireless communications device is at least partly aligned with a further repetitive discontinuous reception scheme of the remote wireless communications device for non-relay traffic exchanged between the remote wireless communications device and the relaying device.

10. A remote wireless communications device, configured to communicate with a radio access node, via a relaying device, the remote wireless communications device further being configured to:

based on a time offset between a first paging occasion, PO, on a radio link between the radio access node and the relaying device and a second PO on a sidelink, SL, between the remote wireless communications device and the relaying device, monitor for a paging message on the SL between the remote wireless communications device and the relaying device in accordance with a repetitive discontinuous reception scheme of the remote wireless communications device, wherein the time offset is based on a time taken by the relaying device to relay the paging message to the remote wireless communications device.

11. The remote wireless communications device according to claim 10, wherein the discontinuous reception scheme comprises a first discontinuous reception scheme associated with a radio link between the remote wireless communications device and the relaying device.

12. The remote wireless communications device according to claim 10, wherein the discontinuous reception scheme comprises a second discontinuous reception scheme associated with a radio link between the radio access node and the relaying device.

13. The remote wireless communications device according to claim 12, wherein the first discontinuous reception scheme is configured separately from the second discontinuous reception scheme.

14. The remote wireless communications device according to claim 12, wherein the first discontinuous reception scheme and the second discontinuous reception scheme share a same configuration for discontinuous reception of paging messages.

15. The remote wireless communications device according to claim 10, wherein the second PO on the SL is further determined by a time offset in relation to a timing of the radio access node.

16. The remote wireless communications device according to claim 10, wherein the second PO on the SL is further determined by a time offset in relation to a same timing source as the radio link between the radio access node and the relaying device.

* * * * *